United States Patent [19]
Makino

[11] Patent Number: 5,867,415
[45] Date of Patent: Feb. 2, 1999

[54] MULTIPLICATION ELEMENT INCLUDING A WALLACE TREE CIRCUIT HAVING ADDERS DIVIDED INTO HIGH AND LOW ORDER ADDERS

[75] Inventor: Hiroshi Makino, Tokyo, Japan

[73] Assignee: Mitsubishi Denki Kabushiki Kaisha, Tokyo, Japan

[21] Appl. No.: 686,072

[22] Filed: Jul. 24, 1996

[30] Foreign Application Priority Data

Feb. 27, 1996 [JP] Japan ........................................ 8-40111

[51] Int. Cl.$^6$ ........................................................ G06F 7/52
[52] U.S. Cl. ................................ 364/760.02; 364/760.03
[58] Field of Search ............................ 364/760.02, 760.03

[56] References Cited

U.S. PATENT DOCUMENTS

| | | | |
|---|---|---|---|
| 5,257,217 | 10/1993 | Chiu | 364/760.02 |
| 5,325,320 | 6/1994 | Chiu | 364/760.02 |
| 5,426,599 | 6/1995 | Machida | 364/760.03 |
| 5,465,226 | 11/1995 | Goto | 364/760.02 |
| 5,504,915 | 4/1996 | Rarick | 364/760.02 |
| 5,544,084 | 8/1996 | Fukumoto | 364/760.02 |

*Primary Examiner*—David H. Malzahn
*Attorney, Agent, or Firm*—Burns, Doane, Swecker & Mathis, LLP

[57] ABSTRACT

A multiplication element including a plurality of partial product generating circuits for inputting a multiplicand and a plurality of modified multipliers obtained based on a multiplier, and for generating $0^{th}$ partial products corresponding to the modified multipliers, a Wallace tree circuit formed by an array of rows comprising at least one i-th first ($1 \leq i$) adder, and a final adder for adding the pair of final partial products so as to obtain a result of the multiplication of the multiplicand by the multiplier. Each of the at least one i-th adder comprises a plurality of bits arranged in columns. The Wallace tree circuit is adapted to add a predetermined number of j-th ($0 \leq j \leq i-1$) partial products so as to generate i-th partial products, add partial products like a tree while sequentially decreasing the number of the partial products, and output a pair of final partial products. The at least one i-th first adder of the Wallace tree circuit is separated on a particular bit of the multiplication result as a boundary into high and low order adders and the high and lower order adders are provided in rows which are different from each other.

17 Claims, 25 Drawing Sheets

MULTIPLICATION ELEMENT INCLUDING A WALLACE TREE CIRCUIT HAVING ADDERS DIVIDED INTO HIGH AND LOW ORDER ADDERS

BACKGROUND OF THE INVENTION

1. Field of the Invention

The present invention relates to a multiplication element, and more particularly to a multiplication element using a Wallace tree.

2. Description of the Background Art

Multiplication is one of the operations which are performed most often in a computer. When forming a high-speed calculating system, it is necessary to enhance the speed of multiplication. As a method for implementing high-speed multiplication, a Booth algorithm for modifying a multiplier to reduce the count of partial products has been known well. Furthermore, a multiplication element using Wallace tree which adds partial products like a tree to sequentially reduce the count of the partial products has been known well.

FIG. 19 is a block diagram showing the structure of a multiplication element using the above two methods. By way of example, such a structure has been described in Japanese Patent Application Laid-Open Gazette No. 3-177922. A multiplicand 101 and a multiplier 102 are formed by 16 bits respectively, for example. A Booth encoder 103 outputs a multiplier which is obtained by modifying the multiplier 102 (hereinafter referred to as a "modified multiplier").

In general, if the modified multiplier is found by using an n-th Booth algorithm, the count of partial products can initially be reduced to one n-th. "Initially" implies the count of partial products above is obtained by the operation of a multiplicand and 1 bit of the modified multiplier. The partial product "initially" obtained will be hereinafter referred to as a "0th partial product".

When the order of the Booth algorithm is increased, a circuit scale necessary for the 0th partial product becomes larger and the time necessary for the generation of the 0th partial product also becomes longer. Consequently, a second Booth algorithm is used very often. Also in the example shown in FIG. 19, the second Booth algorithm is employed in which Booth encode elements 45 to 52 that output the modified multipliers for 8 bits corresponding to half of the 16 bits are provided in the Booth encoder 103.

The outputs 104 to 111 of the Booth encode elements 45 to 52 are modified multipliers and, at the same time, control signals of shifter/inverters 113 to 120 respectively. In the second Booth algorithm, a multiplicand is kept as it is if the modified multiplier is 1, the multiplicand is shifted by 1 bit if the modified multiplier is 2, and the multiplicand is inverted if the modified multiplier is a negative number. Thus, the operation is performed. Accordingly, the shifter/inverters 113 to 120 keep the multiplicand 101 as it is, shift the multiplicand 101 by 1 bit or invert the multiplicand 101 based on the outputs 104 to 111 respectively, so that 0th partial products 121 to 128 are generated.

The place of each of the Booth encode elements 45 to 52 is increased in this order. Consequently, the place of each of the 0th partial products 121 to 128 generated by the shifter/inverters 113 to 120 which are controlled by the outputs 104 to 111 is also increased in this order. Since the second Booth algorithm is employed, the place of the 0th partial product is increased by 2 bits as that of the modified multiplier is increased by 1 bit.

The 0th partial products 121 to 128 are input to a Wallace tree portion 129 and added together like a tree. Consequently, a first partial product, a second partial product, . . . are generated. When the order of the partial product is increased, the number of the partial products is decreased.

FIG. 20 is a block diagram schematically showing the structure of the Wallace tree portion 129. "Schematically" means that the state in which bits of the partial products are matched is not shown. The Wallace tree portion 129 has first adders 138 and 139, and a second adder 140. The 0th partial products 121 to 124 are given to the first adder 138 to generate a pair of (that is, two) first partial products 141. The 0th partial products 125 to 128 are given to the first adder 139 to generate a pair of first partial products 142. Furthermore, two pairs of (that is, four) first partial products 141 and 142 are given to the second adder 140 to generate a pair of final partial products (second partial products) 130.

FIG. 21 is a circuit diagram showing the structure of the first adder 138. 4-input (with carry-in) 2-output (with carry-out) adding elements $P_{0101}$, to $P_{01n}$ are sequentially connected in series. Each of the adding elements $P_{0101}$ to $P_{01n}$ comprises a carry-in terminal CI, input terminals I1 to I4 for receiving 1 bit of each of the partial products 121 to 124 respectively, a sum terminal S for outputting the low order bit of an addition result which is obtained from 5 bits given to the carry-in terminal CI and the input terminals I1 to I4, and a carry terminal C and a carry-out terminal CO which output the same high order bit (CI+I1+I2+I3+I4=C×2+CO× 2+S). The carry-out terminal CO of an adding element $P_{01i}$ is connected to the carry-in terminal CI of an adding element $P_{01(i+1)}$ ($1 \leq i \leq n-1$).

The first and second adders 139 and 140 have the same structure. As will be described below, n is set to 23 in the first adders 138 and 139 and n is set to 32 or 24 in the second adder 140.

FIG. 22 is a circuit diagram showing the structure of the 4-input 2-output adding element. Such combination of logic gates can implement the adding elements for performing the above operation. The output of the carry-out terminal CO is not affected by the output of the carry-in terminal CI.

The pair of final partial products 130 are added together in a final adding portion 131 so that a multiplication result 74 is obtained. In order to perform the operation at a high speed, the final adding portion 131 uses the carry look ahead method very often.

FIGS. 23 to 26 are circuit diagrams showing, in detail, only the connecting relationship between the shifter/inverters 113 to 120 and the first adders 138 and 139 and second adder 140 in the structure of the multiplication element according to the prior art shown in FIG. 19. FIG. 23 is continued on FIG. 25 by a virtual line Q4Q4 and on FIG. 24 by a virtual line Q5Q5. FIG. 26 is continued on FIG. 24 by a virtual line Q6Q6 and on FIG. 25 by a virtual line Q7Q7.

In the Wallace tree portion 129, thus, the first adders 138 and 139 and the second adder 140 which are components are provided together with the shifter/inverters 113 to 120.

On the assumption that the multiplicand 101 has 16 bits which might be shifted left by 1 bit, the shifter/inverters 113 to 120 are formed by 17-bit shift/invert elements. For example, the shifter/inverter 113 comprises shift/invert elements $B_{0101}$ to $B_{0117}$ which are transversely arranged sequentially from the least significant bit to the most significant bit. Similarly, the shifter/inverters 114 to 120 comprise shift/invert elements $B_{0201}$ to $B_{0217}$, $B_{0301}$ to $B_{0317}$, $B_{0401}$ to $B_{0417}$, $B_{0501}$ to $B_{0517}$, $B_{0601}$ to $B_{0617}$, $B_{0701}$ to $B_{0717}$, and $B_{0801}$ to $B_{0817}$, respectively.

The first adder 138 comprises adding elements $P_{0101}$ to $P_{0123}$. The 0th partial products 113 to 116 have places which are sequentially varied by 2 bits. Consequently, the number of the adding elements is 17+(4−1)×2=23. In the same manner, the first adder 139 comprises adding elements $P_{0201}$ to $P_{0223}$.

The least significant bit of the 0th partial product given to the first adder 138 is different from that of the 0th partial product given to the first adder 139 by 4×2=8 bits. Consequently, the second adder 140 which receives a pair of first partial products output from each of the first adders 138 and 139 comprises (23+8=31) adding elements $P_{0301}$ to $P_{0331}$ and an adding element $P_{0332}$ which receives the output of the carry terminal C on the most significant bit of the first adder 139.

In the drawings, wirings having a mark of "/" are used for the batch of plural bits, and the numeral attached beside the mark indicates a bit count. If the bit count is 2, the numeral is not attached.

The 0th partial product 121 obtained from the shifter/inverter 113 is given to the adding elements $P_{0101}$ to $P_{0117}$ every bit. In the same way, the 0th partial products 122 to 128 are given to the adding elements $P_{0103}$ to $P_{0119}$, $P_{0105}$ to $P_{0121}$, $P_{0107}$ to $P_{0123}$, $P_{0201}$ to $P_{0217}$, $P_{0203}$ to $P_{0219}$, $P_{0205}$ to $P_{0221}$, and $P_{0207}$ to $P_{0223}$, respectively.

One part of the first partial products 141 obtained from the sum terminals S of the adding elements $P_{0101}$ to $P_{0123}$ are given to the adding elements $P_{0301}$ to $P_{0323}$ of the second adder 140, respectively. The other part of the first partial products 141 obtained from the carry terminals C of the adding elements $P_{0101}$ to $P_{0123}$ are given to the adding elements $P_{0302}$ to $P_{0324}$ of the second adder 140 respectively. The output from the carry terminal C of each adding element has a higher order than that from the sum terminal S thereof by 1 bit.

In the same way, one part of the first partial products 142 obtained from the sum terminals S of the adding elements $P_{0201}$ to $P_{0223}$ are given to the adding elements $P_{0309}$ to $P_{0331}$ of the second adder 140, respectively. The other part of the first partial products 142 obtained from the carry terminals C of the adding elements $P_{0201}$ to $P_{0223}$ are given to the adding elements $P_{0310}$ to $P_{0332}$ of the second adder 140, respectively.

Ordinarily, the above array formed by the shifter/inverters and the adders takes the width of a circuit for 1 bit equally in order to avoid the complexity of wirings which mutually transmit signals. Accordingly, as addition proceeds based on the Wallace tree (that is, the order of the adder is increased), the transverse width necessary for the arrangement of the adders is increased. According to examples shown in FIGS. 23 to 26, the width of the second adder 140 is greater than those of the first adders 138 and 139.

Two methods are employed so as not to require the above large structure. First of all, the adding elements $P_{0301}$ to $P_{0308}$ are omitted. The adding elements $P_{0301}$ to $P_{0308}$ receive two inputs or less from the adding elements $P_{0101}$ to $P_{0108}$ respectively. Accordingly, the adding elements $P_{0301}$ to $P_{0308}$ only output the input values as they are. For this reason, the adding elements $P_{0301}$ to $P_{0308}$ can be omitted.

Secondly, the array is put in order. FIG. 27 is a block diagram schematically showing the state in which the left ends of the shifter/inverters 113 to 120 and adders 138 to 140 are arranged in a column. Since the relationship of signal transmission among the shifter/inverters 113 to 120 and the adders 138 to 140 is the same as in FIGS. 23 to 26, it is simplified so as to avoid the complexity. The adding elements $P_{0301}$ to $P_{0308}$ are omitted and the width of the second adder 140 is greater than those of the adders 138 and 139 by 1 bit.

Even if the array is put in order as described above, the width of a region necessary for the arrangement of the multiplication element is nearly determined by the widths (23 to 24 bits) of the first adders 138 and 139 and the second adder 140. The widths necessary for the shifter/inverters 113 to 120 correspond to 17 bits. Consequently, space regions DS1 and DS2 having the widths for 6 or 7 bits are present. Thus, the area cannot be used effectively.

As the number of bits of the multiplier is increased, the number of the 0th partial products is increased so that the space region becomes larger. As the order of the adder is increased, such a tendency becomes more remarkable. In the multiplication element, most of the whole structure is occupied by the array of the shifter/inverters and the adders. Consequently, when the number of bits of the multiplier is increased, the area of the whole multiplication element cannot be reduced to lower the manufacturing cost. Furthermore, a wiring length is increased so that performance degradation might be caused. It is needless to say that the number of bits of information processed by a microprocessor tends to be increased.

SUMMARY OF THE INVENTION

A first aspect of the present invention is directed to a multiplication element comprising a plurality of partial product generating portions for inputting a multiplicand and a plurality of modified multipliers obtained based on a multiplier, and for generating 0th partial products corresponding to the modified multipliers, a Wallace tree portion provided with at least one i-th ($1 \leq i$) adder which adds j-th ($0 \leq j \leq i-1$) partial products every specific number so as to generate i-th partial products, and for adding partial products like a tree while sequentially decreasing the number of the partial products and for outputting a pair of final partial products, and a final adder for adding the final partial products so as to obtain the result of the multiplication of the multiplicand by the multiplier, wherein the i-th adder of the Wallace tree circuit is separated on the specific digit of the multiplication result as a boundary, and high and low order adders are provided in rows which are different from each other.

A second aspect of the present invention is directed to the multiplication element according to the first aspect of the present invention, wherein a pair of the first adders are provided, the high order adder of one of the first adders is transversely shorter than that of the other first adder, the low order adder of the other first adder is transversely shorter than that of the one of the first adders, and the high order adder of the one of the first adders and the low order adder of the other first adder are provided in the same row.

A third aspect of the present invention is directed to the multiplication element according to the second aspect of the present invention, wherein the first ends of the partial product generating circuits are arranged on the first end of the i-th adder in the same column.

A fourth aspect of the present invention is directed to the multiplication element according to the first aspect of the present invention, wherein the partial product generating circuits are divided into high order parts corresponding to the high order adders of the first adders and low order parts corresponding to the low order adders of the first adders respectively, the high order adders of the first adders are provided in the same rows as one of the low order parts of the partial product generating circuits, and the low order adders of the first adders are provided in the same rows as one of the high order parts of the partial product generating circuits.

A fifth aspect of the present invention is directed to the multiplication element according to the first aspect of the present invention, further comprising a plurality of Booth encoders for generating the modified multipliers according to a Booth algorithm based on the multiplier respectively.

A sixth aspect of the present invention is directed to the multiplication element according to the fifth aspect of the present invention, wherein the partial product generating circuits are divided into high order parts corresponding to the high order adders of the first adders and low order parts corresponding to the low order adders of the first adders respectively, and each of the Booth encoders is provided in the same row as the high order part of the partial product generating circuit corresponding thereto.

A seventh aspect of the present invention is directed to the multiplication element according to the sixth aspect of the present invention, wherein the Booth encoders are provided in the same rows as the low order parts of the partial product generating circuits corresponding thereto.

An eighth aspect of the present invention is directed to the multiplication element according to the seventh aspect of the present invention, wherein each of the Booth encoders is provided between the high and low order parts of the partial product generating circuit corresponding to the each of the Booth encoders.

A ninth aspect of the present invention is directed to the multiplication element according to the sixth aspect of the present invention, wherein the high order adders of the first adders are provided in the same rows as one of the low order parts of the partial product generating circuits, and the low order adders of the first adders are provided in the same rows as one of the high order parts of the partial product generating circuits.

A tenth aspect of the present invention is directed to the multiplication element according to the ninth aspect of the present invention, wherein each of the Booth encoders is provided between the low order part of the partial product generating circuit which is different from the corresponding partial product generating circuit or the low order adder of the i-th adder, and the high order part of the corresponding partial product generating circuit.

An eleventh aspect of the present invention is directed to the multiplication element according to the fifth aspect of the present invention, wherein the partial product generating circuits are divided into high order parts corresponding to the high order adders of the first adders and low order parts corresponding to the low order adders of the first adders respectively, the high and low order parts of the partial product generating circuits are provided in different rows respectively, and each of the Booth encoders is provided in a row between a row where the high order part of the partial product generating circuit corresponding to the each of the Booth encoders is provided and a row where the low order part of the partial product generating circuit corresponding to the each of the Booth encoders is provided.

A twelfth aspect of the present invention is directed to the multiplication element according to the first aspect of the present invention, wherein a pair of the first adders are provided, and the low order adder of one of the first adders is provided on the opposite side to the high order adder of the other first adder with respect to the low order adder of the other first adder.

A thirteenth aspect of the present invention is directed to the multiplication element according to the first aspect of the present invention, wherein the Wallace tree circuit further comprises a carry adder for adding low order carries which are obtained from the most significant digits of the low order adders of the i-th adders respectively, the final adder comprising a fore-stage adder for adding the high order side of the final partial products to the output of the carry adder, and a back-stage adder for inputting the output of the fore-stage adder, and the low order side of the final partial products except for the low order carry so as to obtain the multiplication result.

A fourteenth aspect of the present invention is directed to the multiplication element according to the first aspect of the present invention, wherein the Wallace tree circuit further comprises a carry adder for adding one of each of the low order carry pairs which are carried from the most significant bits of the low order adders of the i-th adders respectively, the other one of each of the low order carry pairs of the low order adders of the i-th adders functions as carry-in on the least significant digit of the high order adder of the i-th adder, the final adder comprising a fore-stage adder for adding the high order side of the pair of the final partial products to the output of the carry adder, and a back-stage adder for inputting the output of the fore-stage adder, and the low order side of the pair of the final partial products except for the low order carry so as to obtain the multiplication result.

A fifteenth aspect of the present invention is directed to the multiplication element according to the sixteenth aspect of the present invention, wherein one of the low order carry pair of the low order adder of the i-th adder functions as carry-in on the least significant digit of the high order adder of the i-th adder, and the other low order carry pair of the low order adder of the i-th adder functions as an input on the least significant digit of the high order adder of an (i+1)th adder.

According to the first aspect of the present invention, in the multiplication element that employs the Wallace tree, the respective i-th adders which require the longest transverse arrangement area are divided into the high and low order adders, and the high and low order adders are provided in rows which are different from each other. Consequently, it is possible to reduce the length of the necessary transverse arrangement area.

According to the second aspect of the present invention, the pair of first adders are separated on the specific digit of the final partial product as a boundary. Consequently, the lengths of the high and low order adders are different from each other for each first adder. Accordingly, the shorter high and low order adders are provided in the same row so that the transverse dimension of the whole multiplication element can be reduced.

According to the third aspect of the present invention, the multiplication element has no space region. Consequently, integration can be enhanced.

According to the fourth and ninth aspects of the present invention, the multiplication element comprises the partial product generating circuits having the low order part provided in the same row as the high order adder of the first adder and having the high order part provided in the same row as the low order adder of the first adder. Consequently, the rows where the partial product generating circuits are provided can be saved.

According to the fifth aspect of the present invention, the number of the modified multipliers can be decreased more than that of digits of the multiplier by the Booth algorithm. Consequently, the number of the partial product generating circuits can be reduced.

According to the sixth and seventh aspects of the present invention, the multiplication element does not require the rows where the Booth encoders should be provided. Consequently, the wirings for transmitting the modified multipliers can be simplified and provided easily.

According to the eighth and tenth aspects of the present invention, the partial product generating circuit is divided into the high and low order parts which correspond to the high and low order adders of the first adder respectively. The high and low order adders of the first adder are divided on the specific digit of the final partial product as a boundary. Consequently, the high and low order parts of the partial product generating portion are also divided on the specific digit of the final partial product. Accordingly, the lengths of the high order parts of the different partial product generating circuits are different from each other. The Booth encoders provided between the high and low order parts which belong to the same partial product generating portion occupy the transversely different positions if the corresponding partial product generating portions are varied. Consequently, in the case where the directions in which the multiplier and the multiplicand are given are parallel with each other, the wirings for transmitting the multiplier to the Booth encoders can be simplified and provided easily.

According to the eleventh aspect of the present invention, the lengths of paths for transmitting the modified multipliers obtained from the Booth encoders to the high and low order parts of the corresponding partial product generating circuits are set equal to each other so that a difference in signal transmission can be controlled obtaining the effects of the multiplication element according to the fourth and eighth aspects of the present invention.

According to the twelfth aspect of the present invention, the high and low order digits of the first partial product are led out in the opposite directions to each other. Consequently, even if the first and more partial products should be fetched in any direction, it is not necessary to route the whole partial products but only the high or low order digits.

According to the thirteenth aspect of the present invention, only a pair of inputs are sent to the back-stage adder for each digit. In other words, the output of the fore-stage adder and the low order side circuit of the final partial product except for the low order carry do not overlap each other on any digit. Consequently, the back-stage adder can be implemented easily by the carry look ahead method or the like. In addition, the adding processing of the low order side of the back-stage adder (the low order side circuit of the final partial product except for the low order carry) can be executed at the same time during the execution of the adding processing in the fore-stage adder. Consequently, speed deterioration can be prevented from occurring due to the presence of the fore-stage adder. Accordingly, the carry processing can be performed without speed delay.

According to the fourteenth aspect of the present invention, the multiplication element can suppress the numbers of the inputs and outputs of the carry adder. Consequently, the structure can be simplified and the effects of the multiplication element according to the thirteenth aspect of the present invention can be obtained.

According to the fifteenth aspect of the present invention, it is not necessary to provide a carry adder separately. In addition, it is not necessary to provide a fore-stage adder for adjusting the overlap of the digits on high and low order sides of the final partial product. Consequently, the amount of hardware can be reduced and the effects of the multiplication element according to the thirteenth aspect of the present invention can be obtained.

In order to solve the above problems, it is an object of the present invention to provide the technology for reducing the area necessary for a multiplication element so as to lower the cost of a semiconductor integrated circuit comprising the multiplication element.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram showing a first embodiment of the present invention;

FIG. 6 is a block diagram showing a second embodiment of the present invention;

DESCRIPTION OF THE PREFERRED EMBODIMENTS (A) Basic Idea

Figure 1:
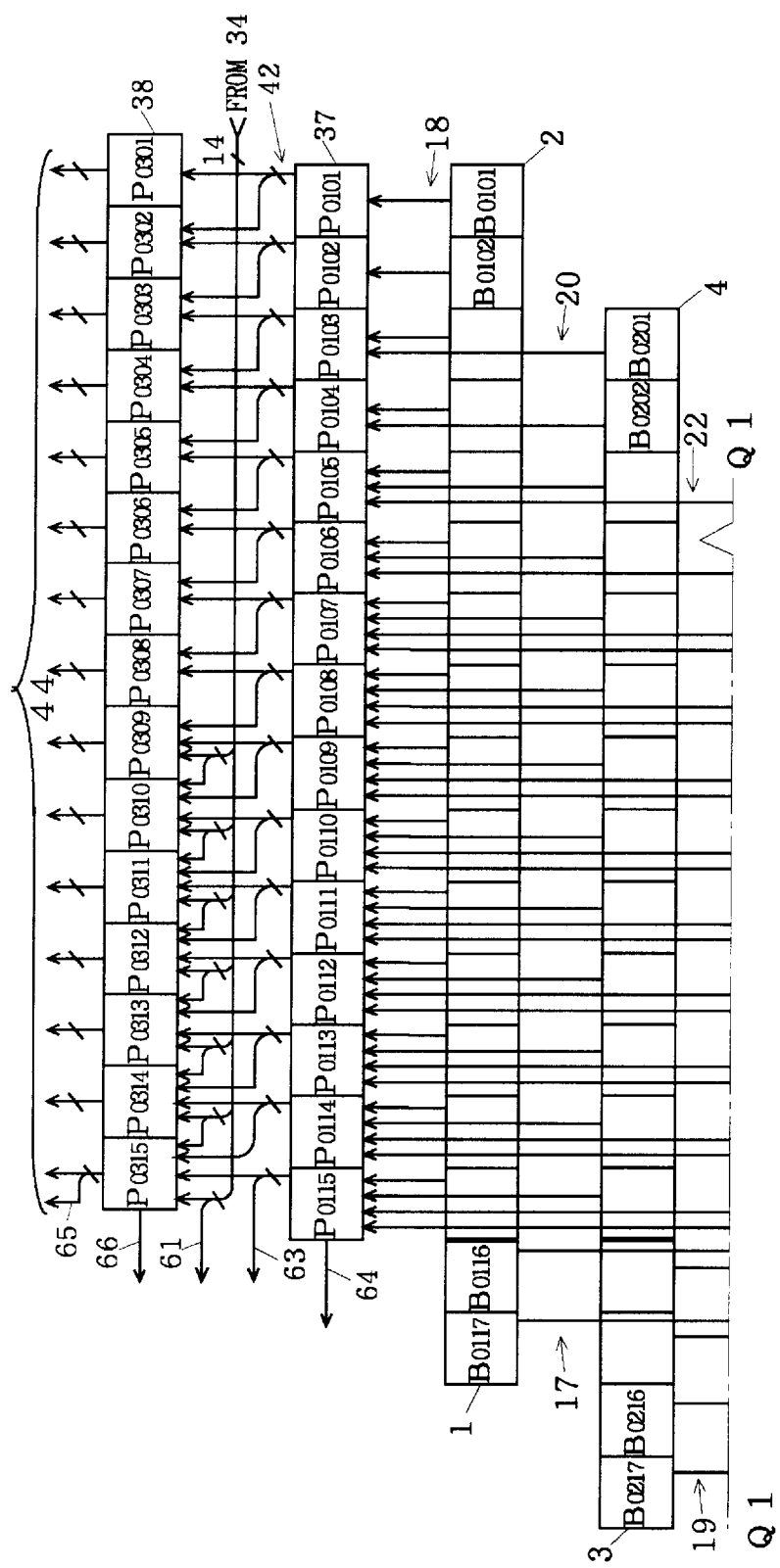
FIG. 1 is a block diagram showing the basic idea of the present invention together with FIGS. 2 to 4.
Figure 2:
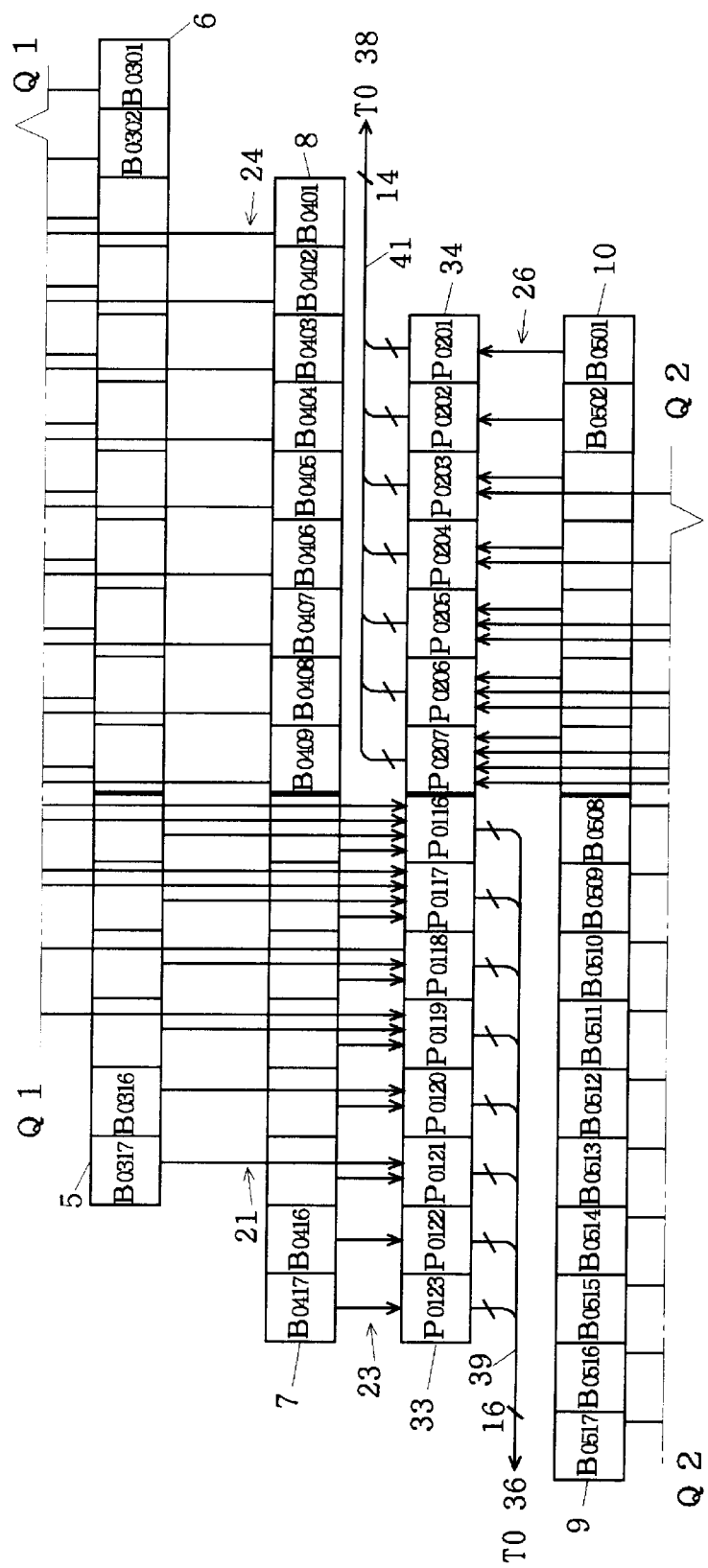
FIG. 2 is a block diagram showing the basic idea of the present invention together with FIGS. 1, 3 and 4.
Figure 3:
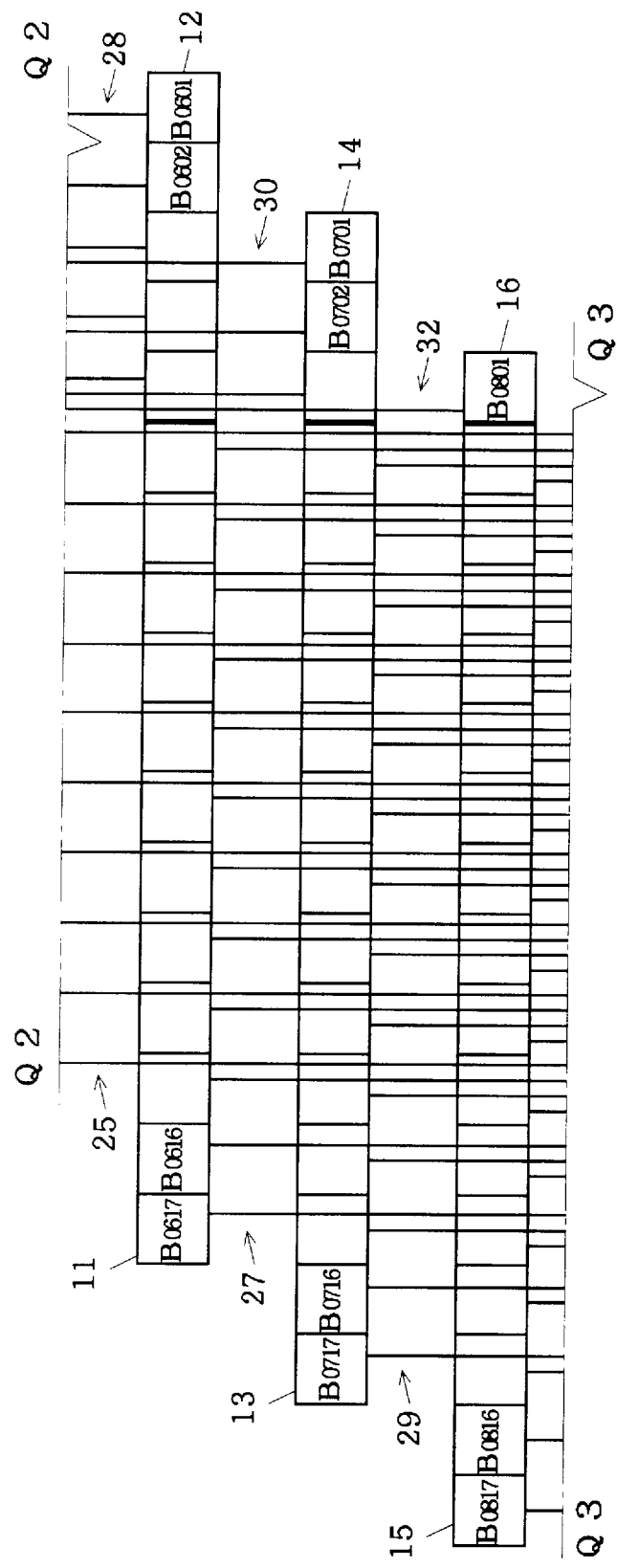
FIG. 3 is a block diagram showing the basic idea of the present invention together with FIGS. 1, 2 and 4.
Figure 4:
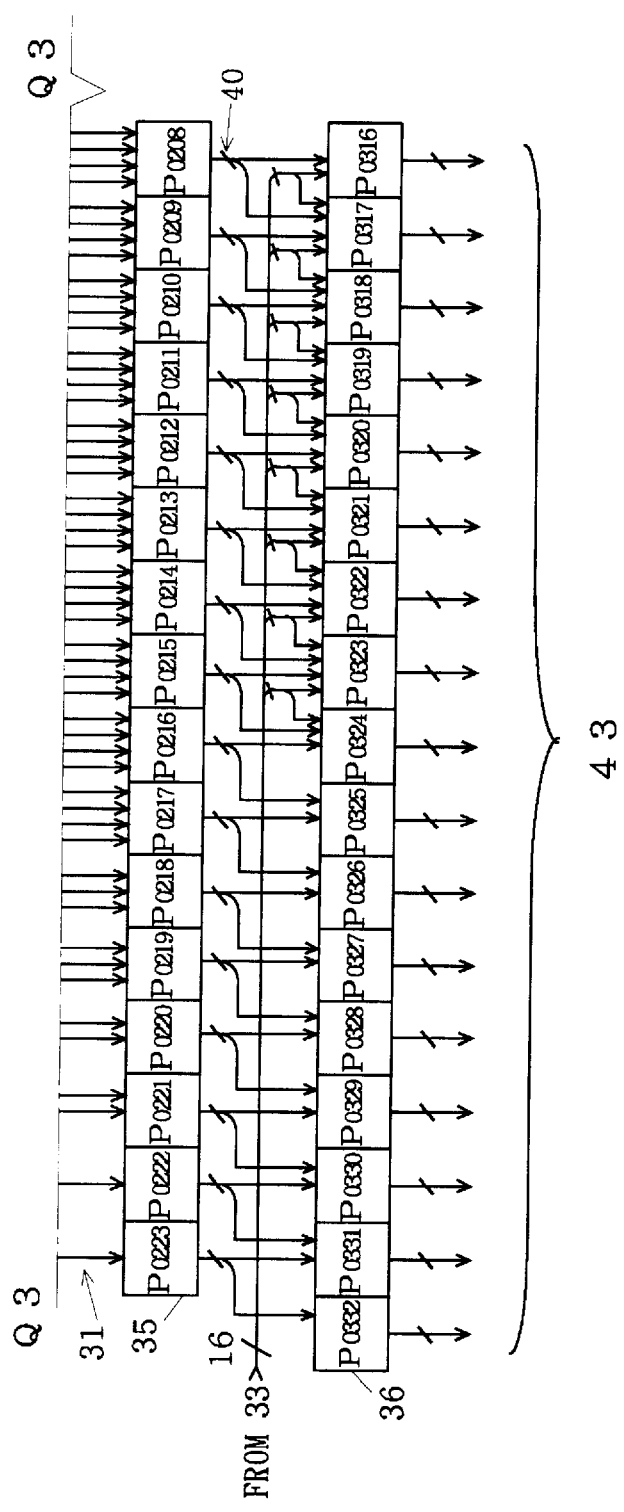
FIG. 4 is a block diagram showing the basic idea of the present invention together with FIGS. 1 to 3.
Figure 19:
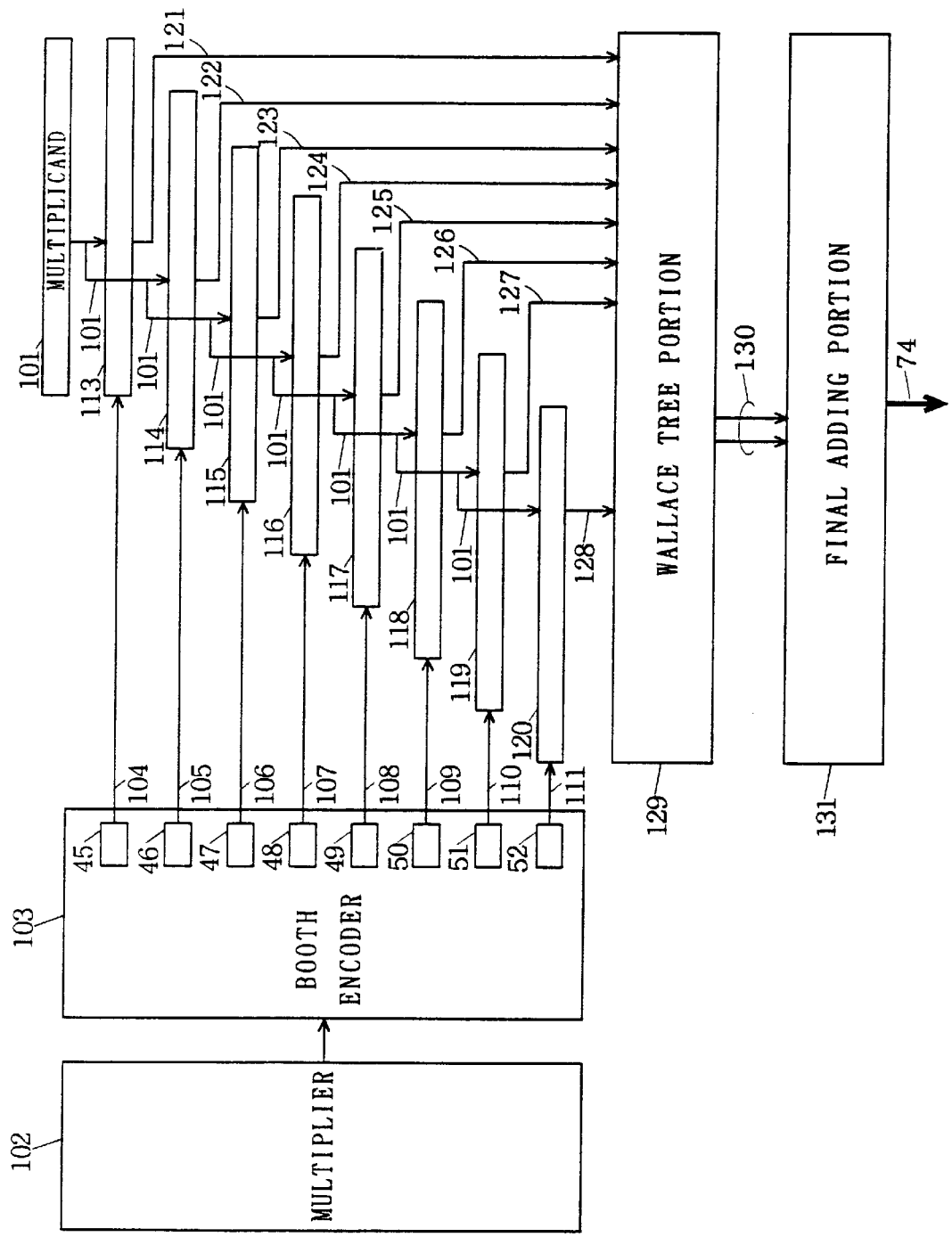
FIG. 19 is a block diagram showing the structure of a multiplication element according to the prior art.
Figure 20:
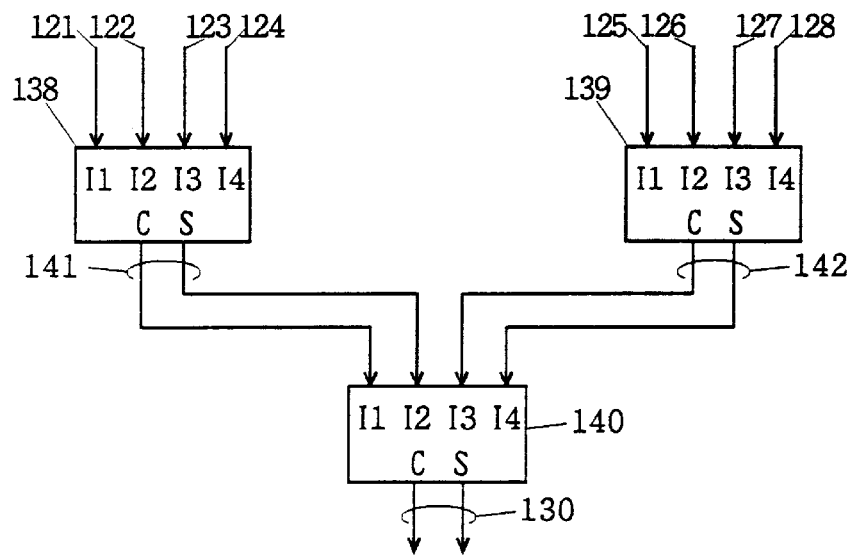
FIG. 20 is a block diagram showing the prior art.

FIGS. 1 to 4 are circuit diagrams showing the basic idea of the present invention together. FIG. 2 is continued on FIG. 1 by a virtual line Q1Q1 and on FIG. 3 by a virtual line Q2Q2. FIG. 4 is continued on FIG. 3 by a virtual line Q3Q3. FIGS. 1 to 4 show only elements corresponding to those in FIGS. 23 to 26. The portions of the structure shown in FIG. 19 which are omitted in FIGS. 23 to 26, that is, a Booth encoder 103 and a final adding portion 131 are also omitted in FIGS. 1 to 4.

The basic idea of the present invention is grasped in two ways, that is, a structure and a method. The first way is that adders forming a Wallace tree are divided on a particular digit and arranged in different rows. The second way is that accumulative addition of the Wallace tree is divided into two parts which are caused to proceed in directions that are spatially different from each other.

It can be seen that a shifter/inverter 113 comprises a high order part 1 having shift/invert elements $B_{0116}$ and $B_{0117}$ for high order 2 bits and a low order part 2 having shift/invert elements $B_{0101}$ to $B_{0115}$ for low order 15 bits wherein a portion between the 15th and 16th bits from the least significant of a multiplication result acts as a boundary. Similarly, it can be seen that a shifter/inverter 114 comprises a high order part 3 having shift/invert elements $B_{0214}$ to $B_{0217}$ for high order 4 bits and a low order part 4 having shift/invert elements $B_{0201}$ to $B_{0213}$ for low order 13 bits wherein a portion between the 15th and 16th bits from the least significant of the multiplication result acts as a boundary (a portion between the 13th and 14th bits from the least significant of the shifter/inverter 114 itself acts as a boundary). It can be seen that a shifter/inverter 115 comprises a high order part 5 having shift/invert elements $B_{0312}$ to $B_{0317}$ for high order 6 bits and a low order part 6 having shift/invert elements $B_{0301}$ to $B_{0311}$ for low order 11 bits wherein a portion between the 15th and 16th bits from the least significant of the multiplication result acts as a boundary (a portion between the 11th and 12th bits from the least significant of the shifter/inverter 115 itself acts as a boundary). It can be seen that a shifter/inverter 116 comprises a high order part 7 having shift/invert elements $B_{0410}$ to $B_{0417}$ for high order 8 bits and a low order part 8 having shift/invert elements $B_{0401}$ to $B_{0409}$ for low order 9 bits wherein a portion between the 15th and 16th bits from the least significant of the multiplication result acts as a boundary (a portion between the 9th and 10th bits from the least significant of the shifter/inverter 116 itself acts as a boundary).

Furthermore, it can be seen that a shifter/inverter 117 comprises a high order part 9 having shift/invert elements $B_{0508}$ to $B_{0517}$ for high order 10 bits and a low order part 10 having shift/invert elements $B_{0501}$ to $B_{0507}$ for low order 7 bits wherein a portion between the 15th and 16th bits from the least significant of the multiplication result acts as a boundary (a portion between the 7th and 8th bits from the least significant of the shifter/inverter 117 itself acts as a boundary). It can be seen that a shifter/inverter 118 comprises a high order part 11 having shift/invert elements $B_{0606}$ to $B_{0617}$ for high order 12 bits and a low order part 12 having shift/invert elements $B_{0601}$ to $B_{0605}$ for low order 5 bits wherein a portion between the 15th and 16th bits from the least significant of the multiplication result acts as a boundary (a portion between the 5th and 6th bits from the least significant of the shifter/inverter 118 itself acts as a boundary). It can be seen that a shifter/inverter 119 comprises a high order part 13 having shift/invert elements $B_{0704}$ to $B_{0717}$ for high order 14 bits and a low order part 14 having shift/invert elements $B_{0701}$ to $B_{0703}$ for low order 3 bits wherein a portion between the 15th and 16th bits from the least significant of the multiplication result acts as a boundary (a portion between the 3rd and 4th bits from the least significant of the shifter/inverter 119 itself acts as a boundary). It can be seen that a shifter/inverter 120 comprises a high order part 15 having shift/invert elements $B_{0802}$ to $B_{0817}$ for high order 16 bits and a low order part 16 having a shift/invert element $B_{0801}$ for low order 1 bit wherein a portion between the 15th and 16th bits from the least significant of the multiplication result acts as a boundary (a portion between the 1st and 2nd bits from the least significant of the shifter/inverter 120 itself acts as a boundary).

The high order parts 1, 3, 5, 7, 9, 11, 13 and 15 output the high order side portions of the 0th partial products, that is, high order partial products 17, 19, 21, 23, 25, 27, 29 and 31 respectively. The low order parts 2, 4, 6, 8, 10, 12, 14 and 16 output the low order side portions of the 0th partial products, that is, low order partial products 18, 20, 22, 24, 26, 28, 30 and 32 respectively. The high order partial product 17 and the low order partial product 18 form a partial product 121. The high order partial product 19 and the low order partial product 20 form a partial product 122. The high order partial product 21 and the low order partial product 22 form a partial product 123. The high order partial product 23 and the low order partial product 24 form a partial product 124. The high order partial product 25 and the low order partial product 26 form a partial product 125. The high order partial product 27 and the low order partial product 28 form a partial product 126. The high order partial product 29 and the low order partial product 30 form a partial product 127. The high order partial product 31 and the low order partial product 32 form a partial product 128.

It can be seen that a first adder 138 comprises a high order adder 33 having adding elements $P_{0116}$ to $P_{0123}$ for high order 8 bits and a low order adder 37 having adding elements $P_{0101}$ to $P_{0115}$ for low order 15 bits wherein a portion between the 15th and 16th bits from the least significant of the multiplication result acts as a boundary. It can be seen that a first adder 139 comprises a high order adder 35 having adding elements $P_{0208}$ to $P_{0223}$ for high order 16 bits and a low order adder 34 having adding elements $P_{0201}$ to $P_{0207}$ for low order 7 bits wherein a portion between the 15th and 16th bits from the least significant of the multiplication result acts as a boundary (a portion between the 7th and 8th bits from the least significant of the first adder 139 itself acts as a boundary).

Furthermore, it can be seen that a second adder 140 comprises a high order adder 36 having adding elements $P_{0316}$ to $P_{0332}$ for high order 17 bits and a low order adder 38 having adding elements $P_{0301}$ to $P_{0315}$ for low order 15 bits wherein a portion between the 15th and 16th bits from the least significant of the multiplication result acts as a boundary.

Based on the first way, the high order adder 33 and the low order adder 37 which form the first adder 138 are provided in rows which are different from each other. In the same manner, the high order adder 35 and the lower order adder 34 which form the first adder 139 are provided in rows which are different from each other. In addition, the high order adder 36 and the low order adder 38 which form the second adder 140 are also provided in rows which are different from each other. Accordingly, if the shifter/inverters 113 to 120, the first adders 138 and 139 and the second adder 140 are arranged as described above, the maximum value of the transverse width does not exceed 17 bits of the high order adder 36.

According to the present invention, the first adders 138 and 139 and the second adder 140 which hinder a reduction in the transverse width in the prior art are divided for arrangement. Thus, it is possible to reduce the transverse width.

Based on the second way, the high order partial products 17, 19, 21, 23, 25, 27, 29 and 31 of the 0th partial products are transmitted downward in FIGS. 1 to 4. Consequently, the high order partial products 39 and 40 of the first partial products are obtained by the high order adders 33 and 35 of the first adders 138 and 139 respectively, and the high order partial product 43 of the second partial product is obtained by the high order adder 36 of the second adder 140.

The low order partial products 18, 20, 22, 24, 26, 28, 30 and 32 of the 0th partial products are transmitted upward in FIGS. 1 to 4. Consequently, the low order partial products 42 and 41 of the first partial products are obtained by the low order adders 37 and 34 of the first adders 138 and 139 respectively, and the low order partial product 44 of the second partial product is obtained by the low order adder 38 of the second adder 140.

By dividing and arranging the first adders 138 and 139 and the second adder 140, the accumulative addition in two directions which are spatially different from each other can be performed easily. Consequently, even if the first and more partial products should be fetched upward or downward, it is not necessary to route the whole partial products but only the high or low order bits.

Also in the case where the first adders 138 and 139 and the second adder 140 are divided and arranged, a signal can be obtained from a carry terminal C and a carry-out terminal CO. For example, a signal 61 is obtained from the carry terminal C of the adding element $P_{0207}$ which corresponds to the most significant bit of the low order adder 34. A signal 62 is obtained from the carry-out terminal CO of the adding element $P_{0207}$. Since the signal 62 is sent to the carry-in terminal CI of the adding element $P_{0116}$ which corresponds to the least significant bit of the high order adder 33, it is not shown in FIG. 2. Signals 63 and 64 are obtained from the carry terminal C and the carry-out terminal CO of the adding element $P_{0115}$ which corresponds to the most significant bit of the low order adder 37, respectively. Signals 65 and 66 are obtained from the carry terminal C and the carry-out terminal CO of the adding element $P_{0315}$ which corresponds to the most significant bit of the low order adder 38, respectively. Variations related to the transmission of these signals will be described in "C. Carry Processing" in the second next chapter.

B. Arrangement of Shifter/Inverter and Adder

Figure 27:
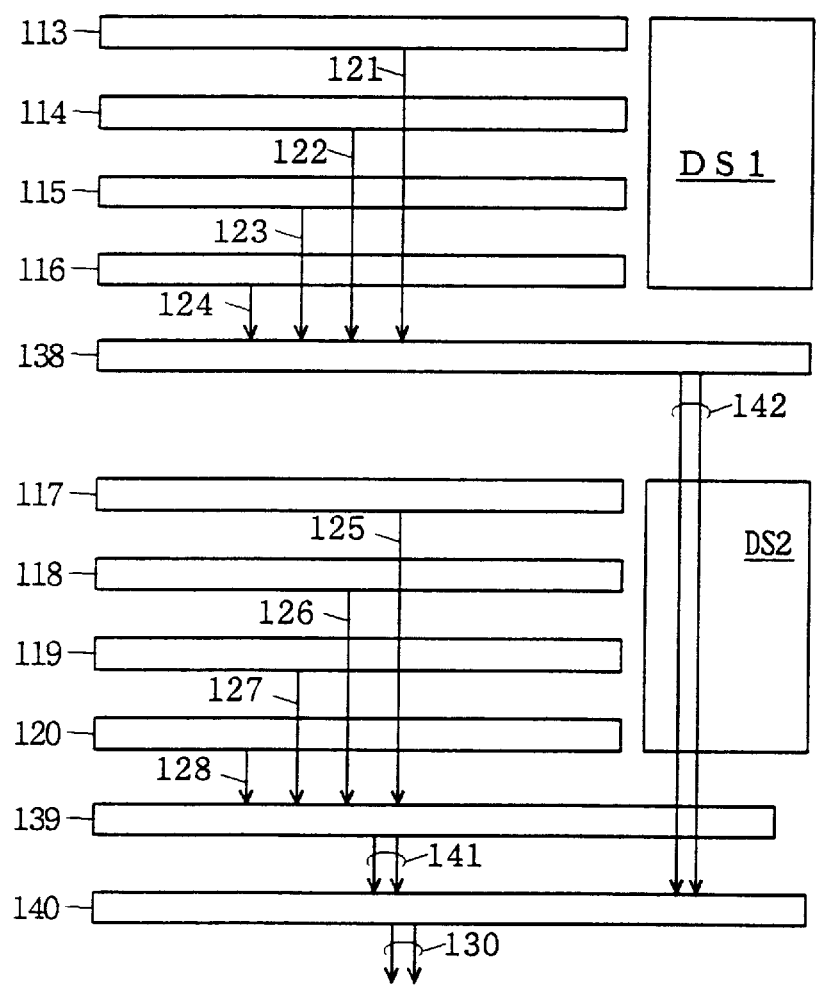
FIG. 27 is a block diagram showing the prior art.

In the array shown in FIGS. 1 to 4, the maximum value of the transverse width can be reduced. However, it is desired that the ends of the shifter/inverters 113 to 120, the first adders 138 and 139 and the second adder 140 should be arranged as shown in FIG. 27 in order to increase the efficiency of use of the area. Each embodiment of the present chapter provides a variation in array which effectively uses the area remarkably.

(B-1) First Embodiment

Figure 5:
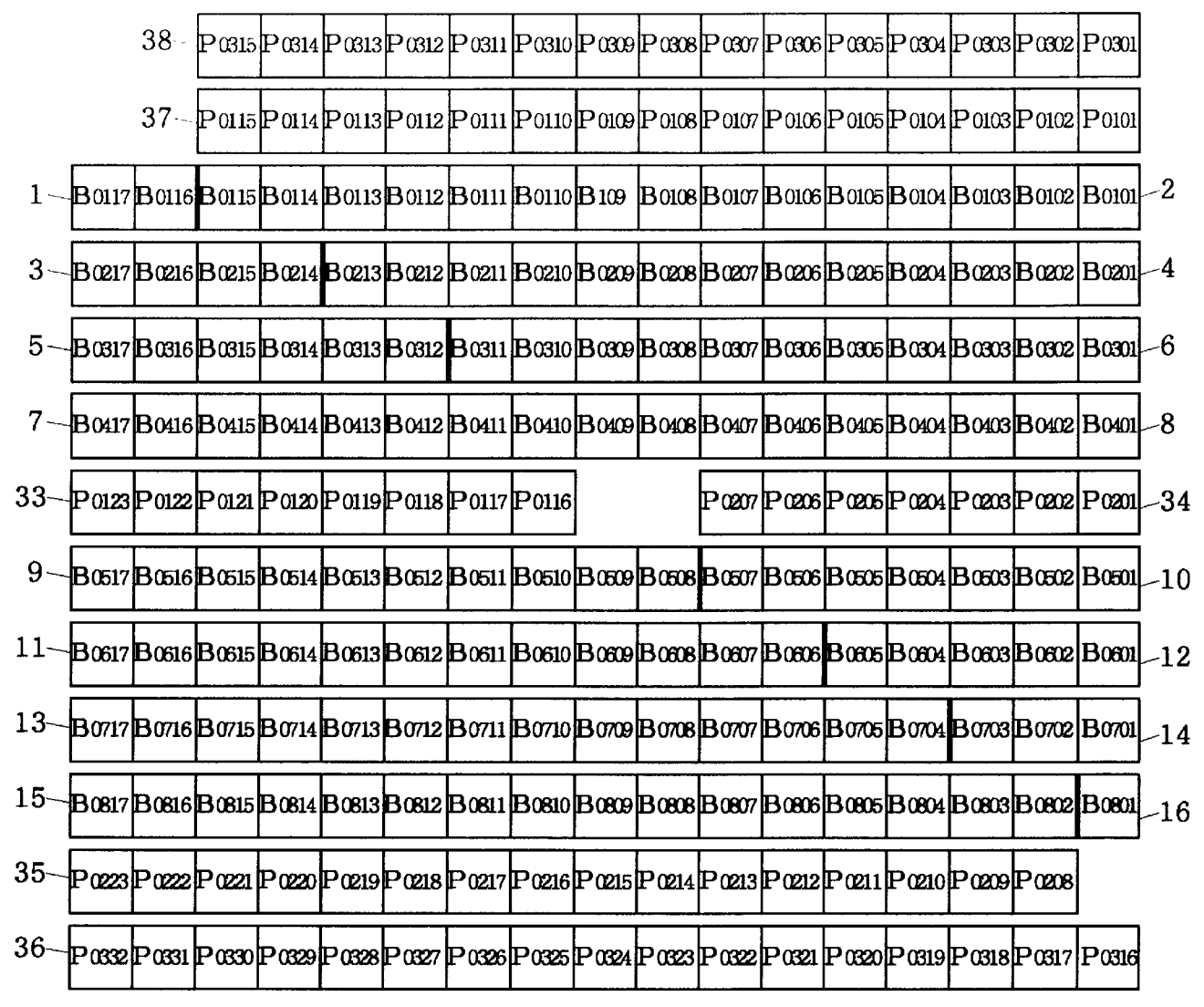

FIG. 5 is a block diagram showing a structure according to a first embodiment of the present invention. Since the relationship of transmission of the 0th to 2nd partial products among shifter/inverters 113 to 120, first adders 138 and 139 and a second adder 140 is the same as in FIGS. I to 4, it is not shown in FIG. 5 in order to avoid the complexity of the drawing.

In FIG. 5, the shifter/inverters 113 to 120 are not divided but are provided downward in this order with their ends arranged. A high order adder 33 of the first adder 138 and a low order adder 34 of the first adder 139 are arranged in the same row between the shifter/inverters 116 and 117 with their first ends arranged on the ends of the shifter/inverters 113 to 120. A low order adder 37 of the first adder 138 and a low order adder 38 of the second adder 140 are arranged upward in this order just above the shifter/inverter 113. Furthermore, a high order adder 35 of the first adder 139 and a high order adder 36 of the second adder 140 are arranged downward in this order just below the shifter/inverter 120.

More specifically, shift/invert elements $B_{0117}$, $B_{0217}$, $B_{0317}$ and $B_{0417}$ corresponding to the most significant bits of high order parts 1, 3, 5 and 7, the adding element $P_{0123}$ corresponding to the most significant bit of the high order adder 33, shift/invert elements $B_{0517}$, $B_{0617}$, $B_{0717}$ and $B_{0817}$ corresponding to the most significant bits of high order parts 9, 11, 13 and 15, the adding element $P_{0223}$ corresponding to the most significant bit of the high order adder 35, and an adding element $P_{0332}$ corresponding to the most significant bit of the high order adder 36 are arranged downward in this order in the same column (a column on the left end in FIG. 5).

Adding elements $P_{0301}$ and $P_{0101}$ corresponding to the least significant bits of the low order adders 38 and 37, shift/invert elements $B_{0101}$, $B_{0201}$, $B_{0301}$, and $B_{0401}$ corresponding to the least significant bits of low order parts 2, 4, 6 and 8, the adding element $P_{0201}$ corresponding to the least significant bit of the low order adder 34, shift/invert elements $B_{0501}$, $B_{0601}$, $B_{0701}$, and $B_{0801}$, corresponding to the least significant bits of low order parts 10, 12, 14 and 16, and an adding element $P_{0316}$ corresponding to the least significant bit of the high order adder 36 are arranged downward in this order in the same column (a column on the right end in FIG. 5).

In the first adder 138, the number of bits of the high order adder 33 is smaller than that of bits of the low order adder 37. In the first adder 139, the number of bits of the low order adder 34 is smaller than that of bits of the high order adder 35. Accordingly, even if the high order adder 33 and the low order adder 34 are provided in the same row, the transverse width is smaller than those of the first adders 138 and 139.

In addition, the boundary between the high and low order parts of the shifter/inverter for generating the 0th partial product is placed in the vicinity of the center of the multiplication result, that is, on the 15th and 16th bits from the least significant of the multiplication result. In other words, the boundary is placed in a position where all the shifter/inverters can be divided. For this reason, the second adder 140 is divided, for arrangement, into high and low order adders 36 and 38 in which the numbers of bits do not exceed 17.

Accordingly, the area is used effectively without forming space regions DS1 and DS2 therein unlike the prior art. Thus, it is possible to enhance the integration of the array of the shifter/inverters 113 to 120, the first adders 138 and 139, and the second adder 140.

As a matter of course, the adding element $P_{0315}$ corresponding to the most significant bit of the low order adder 38 and the adding element $P_{0115}$ corresponding to the most significant bit of the low order adder 37 may be arranged in a column on the left end in FIG. 5, or the adding element $P_{0208}$ corresponding to the least significant bit of the high order adder 35 may be arranged in a column on the right end in FIG. 5.

(B-2) Second Embodiment

Figure 6:
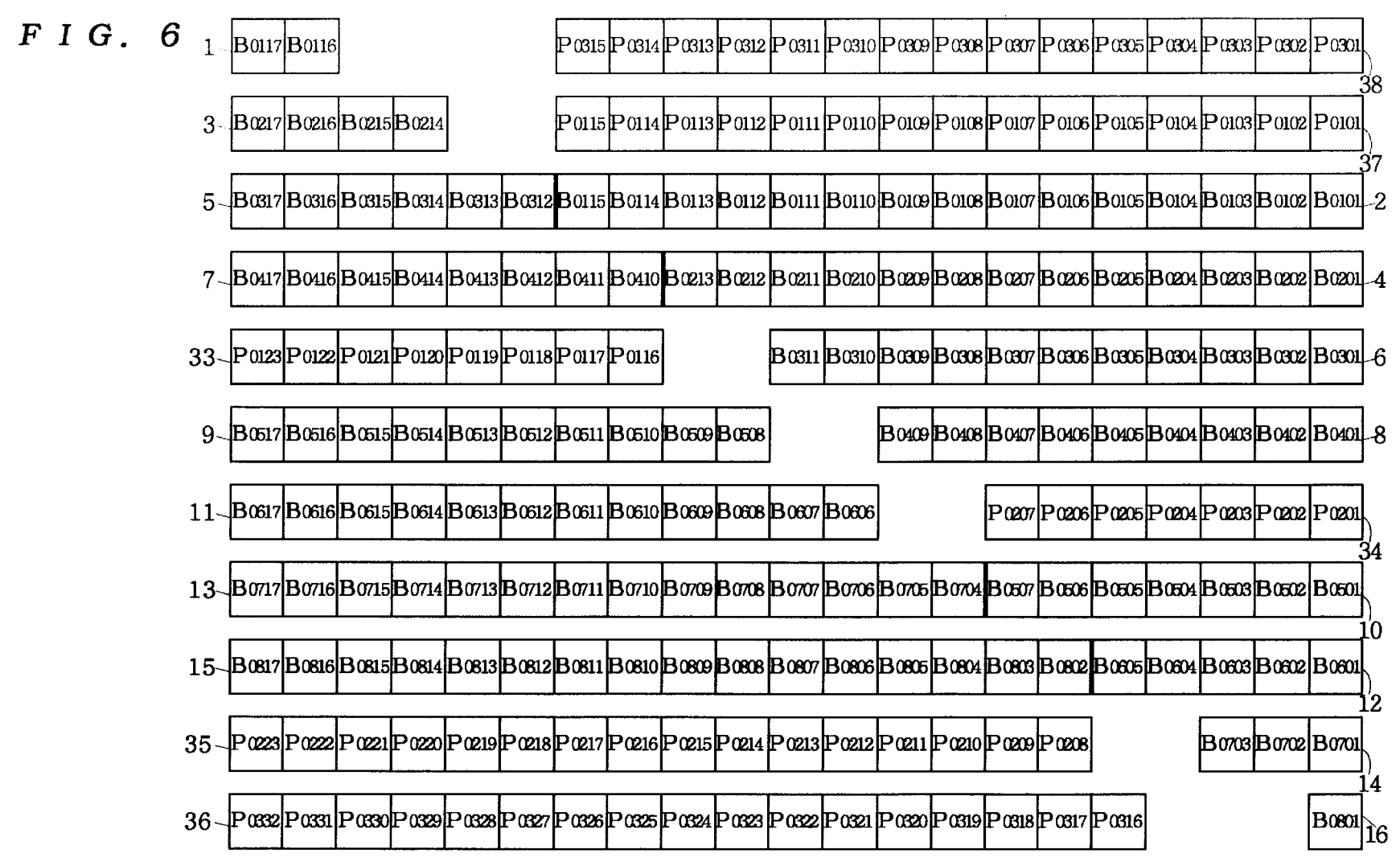

FIG. 6 is a block diagram showing a structure according to a second embodiment of the present invention. Unlike the first embodiment, the high order adder 33 of the first adder 138 and the low order adder 34 of the first adder 139 are provided in rows which are different from each other. High and row order parts forming the same shift/inverter are also provided in rows which are different from each other. Furthermore, the high or low order part of the shifter/inverter is also provided in a row where the low order adder 38 of the second adder 140 is provided, a row where the low order adder 37 of the first adder 138 is provided, a row where the high order adder 35 of the first adder 139 is provided, and a row where the high order adder 36 of the second adder 140 is provided.

More specifically, the following arrangement is provided sequentially from the top. The high order part 1 of the shifter/inverter 113 and the low order adder 38 of the second adder 140 are provided in a first row. The high order part 3 of the shifter/inverter 114 and the low order adder 37 of the first adder 138 are provided in a second row. The high order part 5 of the shifter/inverter 115 and the low order part 2 of the shifter/inverter 113 are provided in a third row. The high order part 7 of the shifter/inverter 116 and the low order part 4 of the shifter/inverter 114 are provided in a fourth row. The high order adder 33 of the first adder 138 and the low order part 6 of the shifter/inverter 115 are provided in a fifth row. The high order part 9 of a shifter/inverter 117 and the low order part 8 of the shifter/inverter 116 are provided in a sixth row. The high order part 11 of a shifter/inverter 118 and the low order adder 34 of the first adder 139 are provided in a seventh row. The high order part 13 of the shifter/inverter 119 and the low order part 10 of the shifter/inverter 117 are provided in an eighth row. The high order part 15 of the shifter/inverter 120 and the low order part 12 of the shifter/inverter 118 are provided in a ninth row. The high order adder 35 of the first adder 139 and the low order part 14 of the shifter/inverter 119 are provided in a tenth row. The high order adder 36 of the second adder 140 and the low order part 16 of the shifter/inverter 120 are provided in an eleventh row.

With such array, the 3rd, 4th, 8th and 9th rows determine the transverse width which corresponds to 21 bits. As compared with the fact that the transverse width corresponds to 17 bits in the first embodiment, it is apparent that the region necessary for array is increased transversely. While the number of rows should be 13 in the first embodiment, that of rows should be 11 in the second embodiment. Accordingly, the array can be provided in a smaller longitudinal region.

By applying the second embodiment, even if a larger longitudinal region cannot be prepared, the area can be used effectively for the arrangement of the shifter/inverters and the adders without forming space regions therein.

(B-3) Third Embodiment

Figure 7:
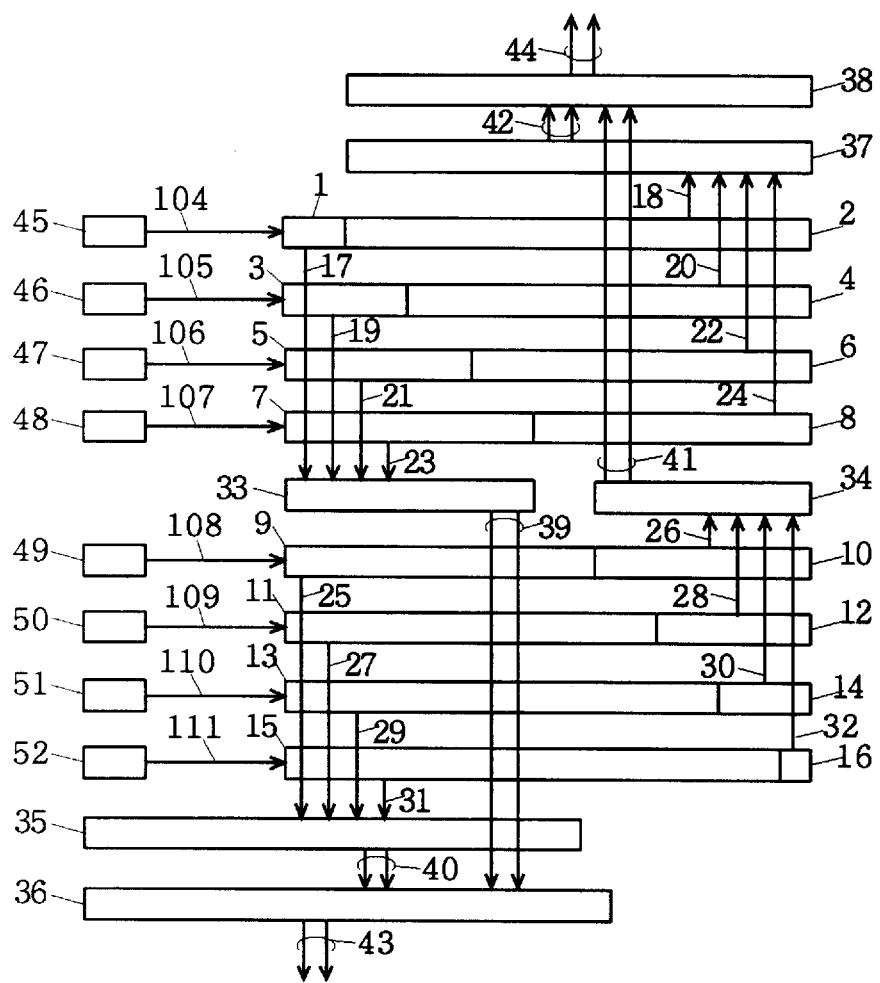
FIG. 7 is a block diagram showing a structure according to a third embodiment of the present invention.

FIG. 7 is a block diagram showing a structure according to a third embodiment of the present invention. For the array described in the first embodiment with reference to FIG. 5, the state in which Booth encode elements 45 to 52 are provided is shown in FIG. 7.

In FIG. 7, since the structures of high order parts 1, 3, 5, 7, 9, 11, 13 and 15, low order parts 2, 4, 6, 8, 10, 12, 14 and 16, high order adders 33, 35 and 36, and low order adders 34, 37 and 38 are the same as those of FIGS. 1 to 6, these are shown as a block having a transverse width corresponding to the number of bits. High order partial products 17, 19, 21, 23, 25, 27, 29 and 31 and low order partial products 18, 20, 22, 24, 26, 28, 30 and 32 of 0th partial products, high order partial products 39 and 40 and low order partial products 41 and 42 of first partial products, and high and low order partial products 43 and 44 of second partial products are conceptually shown by arrows. The accurate relationship of transmission among the 0th to 2nd partial products is the same as in FIGS. 1 to 4.

The Booth encode elements 45 to 52 are provided on the high order part sides of rows where shifter/inverters 113 to 120 are provided. Control signals 104 to 111 as modified multipliers are sent to the shifter/inverters 113 to 120, respectively. According to the present embodiment, it is sufficient that all the control signals are sent to the shifter/inverters which are provided in the same rows. Consequently, the wiring of the control signals can be simplified and provided easily.

(B-4) Fourth Embodiment

Figure 8:
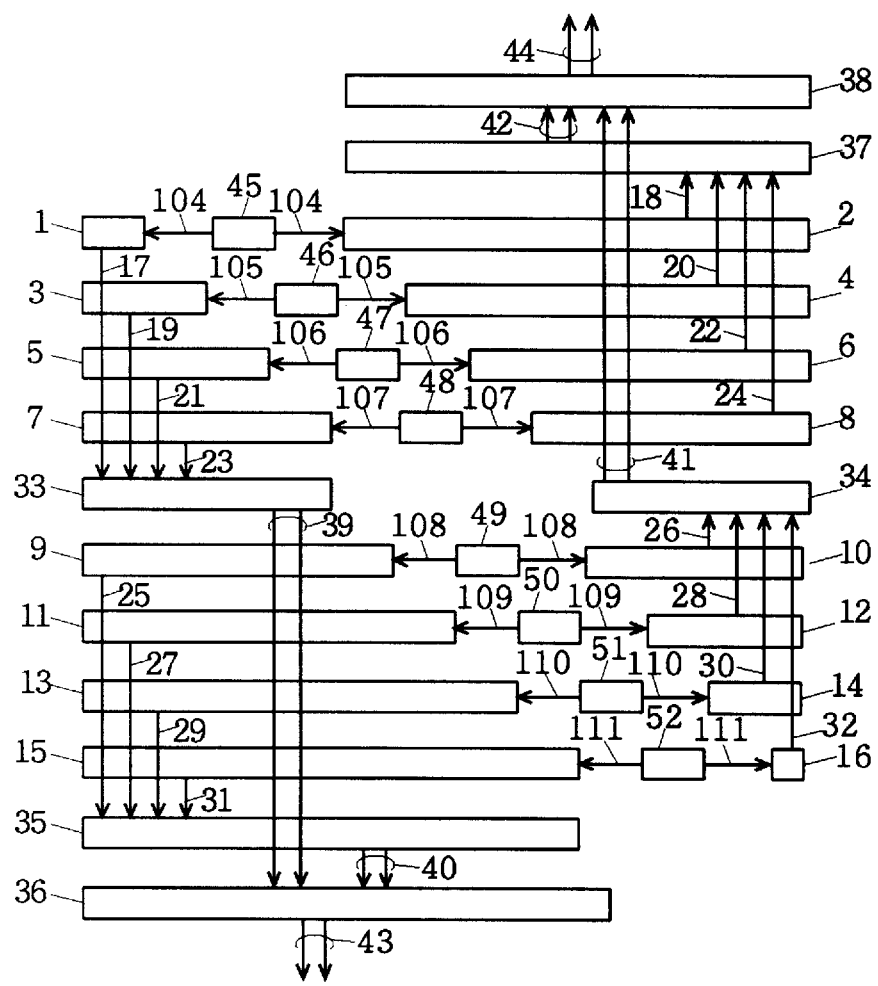
FIG. 8 is a block diagram showing a structure according to a fourth embodiment of the present invention.

FIG. 8 is a block diagram showing a structure according to a fourth embodiment of the present invention. For the array described in the first embodiment with reference to FIG. 5, the state in which Booth encode elements 45 to 52 are provided is shown in FIG. 8.

The Booth encode elements 45 to 52 are provided in rows where shifter/inverters 113 to 120 are provided respectively, and are provided between the high and low order parts of the shifter/inverters unlike the structure shown in FIG. 7 according to the third embodiment. The transverse width of the high order part of each shifter/inverter is varied. For this reason, the Booth encode elements 45 to 52 are transversely provided with gaps (they are not provided in the same column).

Control signals 104 to 111 as modified multipliers are output from the both sides of the Booth encode elements 45 to 52. In other words, the control signal 104 output from the left side of the Booth encode element 45 is sent to the high order part 1 of the shifter/inverter 113, and the control signal 104 output from the right side of the Booth encode element 45 is sent to the low order part 2 of the shifter/inverter 113. Similarly, the control signal 105 output from the left side of the Booth encode element 46 is sent to the high order part 3 of the shifter/inverter 114, and the control signal 105 output from the right side of the Booth encode element 46 is sent to the low order part 4 of the shifter/inverter 114. The control signal 106 output from the left side of the Booth encode element 47 is sent to the high order part 5 of the shifter/inverter 115, and the control signal 106 output from the right side of the Booth encode element 47 is sent to the low order part 6 of the shifter/inverter 115. The control signal 107 output from the left side of the Booth encode element 48 is sent to the high order part 7 of the shifter/inverter 116, and the control signal 107 output from the right side of the Booth encode element 48 is sent to the low order part 8 of the shifter/inverter 116. The control signal 108 output from the left side of the Booth encode element 49 is sent to the high order part 9 of the shifter/inverter 117, and the control signal 108 output from the right side of the Booth encode element 49 is sent to the low order part 10 of the shifter/inverter 117. The control signal 109 output from the left side of the Booth encode element 50 is sent to the high order part 11 of the shifter/inverter 118, and the control signal 109 output from the right side of the Booth encode element 50 is sent to the low order part 12 of the shifter/inverter 118. The control signal 110 output from the left side of the Booth encode element 51 is sent to the high order part 13 of the shifter/inverter 119, and the control signal 110 output from the right side of the Booth encode element 51 is sent to the low order part 14 of the shifter/inverter 119.

The control signal 111 output from the left side of the Booth encode element 52 is sent to the high order part 15 of the shifter/inverter 120, and the control signal 111 output from the right side of the Booth encode element 52 is sent to the low order part 16 of the shifter/inverter 120.

According to the present embodiment, thus, the wirings of control signals can be simplified and provided easily in the same manner as in the third embodiment. In addition, since the Booth encode elements are transversely provided with gaps, the wiring for transmitting a multiplier in parallel with a multiplicand (that is, vertically) to the Booth encode elements can also be simplified and provided easily.

(B-5) Fifth Embodiment

Figure 9:
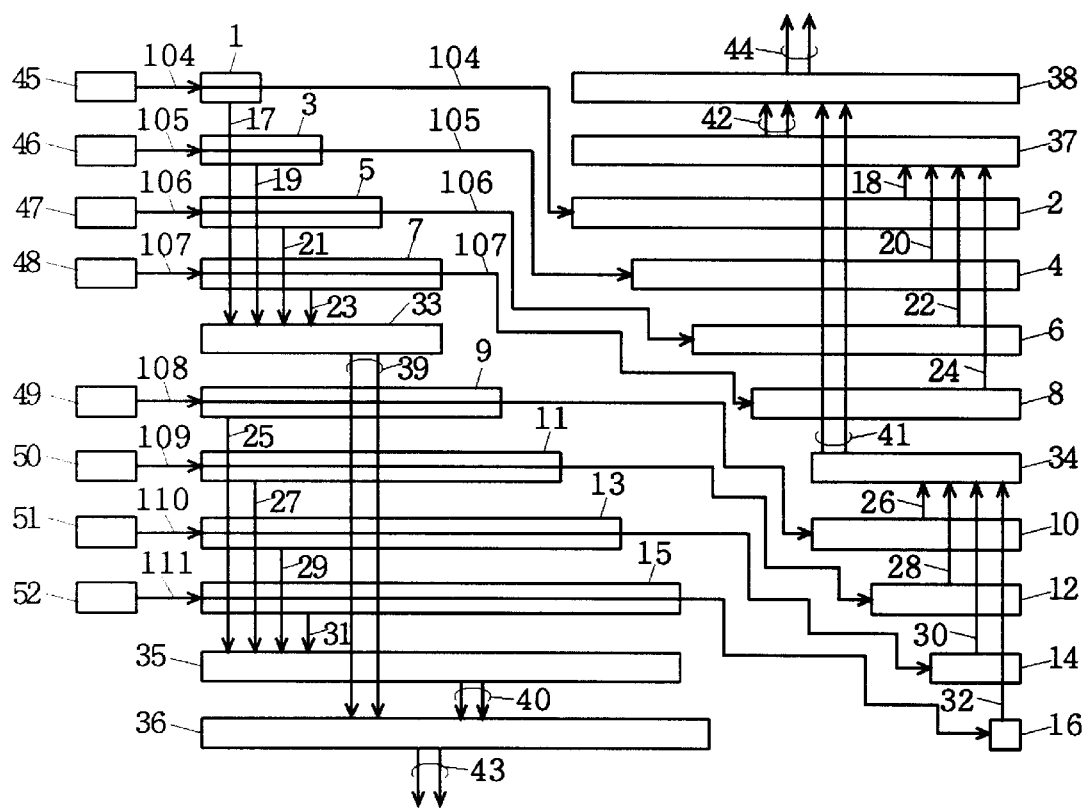
FIG. 9 is a block diagram showing a structure according to a fifth embodiment of the present invention.

FIG. 9 is a block diagram showing a structure according to a fifth embodiment of the present invention. For the array described in the second embodiment with reference to FIG. 6, the state in which Booth encode elements 45 to 52 are provided is shown in FIG. 9.

The Booth encode elements 45 to 52 are provided on the left sides of high order parts 1, 3, 5, 7, 9, 11, 13 and 15 of shifter/inverters 113 to 120 are provided respectively. With such arrangement, it is necessary for the Booth encode elements to transmit control signals to low order parts which are placed below by 2 rows. For this reason, the wirings necessary for such transmission should be provided across the rows. Thus, the wirings becomes complex.

However, at most several wirings are necessary for the transmission of control signals. Consequently, the area is slightly increased with the complexity of the wirings. Accordingly, the effects obtained in the first embodiment are hardly damaged by such arrangement.

(B-6) Sixth Embodiment

Figure 10:
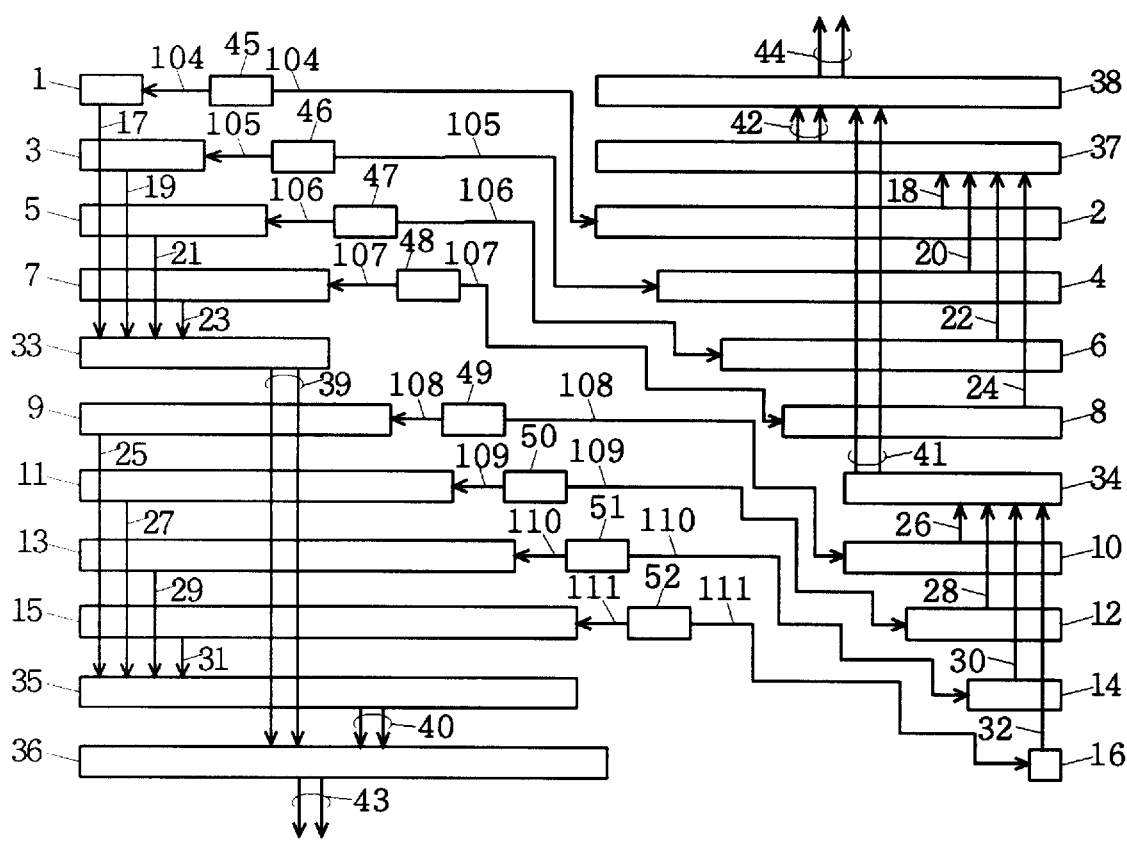
FIG. 10 is a block diagram showing a structure according to a sixth embodiment of the present invention.

FIG. 10 is a block diagram showing a structure according to a sixth embodiment of the present invention. For the array described in the second embodiment with reference to FIG. 6, the state in which Booth encode elements 45 to 52 are provided is shown in FIG. 10.

The Booth encode elements 45 to 52 are provided on the right sides of rows high order parts 1, 3, 5, 7, 9, 11, 13 and 15 of shifter/inverters 113 to 120 are provided respectively. Also in such arrangement, the area is slightly increased with the complexity of the wirings similarly to the fifth embodiment. Accordingly, the effects obtained in the third embodiment are hardly damaged.

In addition, if the transverse width is less limited than the longitudinal length from the viewpoint of the design of a multiplication element, an array in which the number of rows controlled is provided as in the third embodiment. Accordingly, in the case where a multiplier is given in parallel with a multiplicand under such limitations, the sixth embodiment is more desirable than the fourth embodiment.

(B-7) Seventh Embodiment

Figure 11:
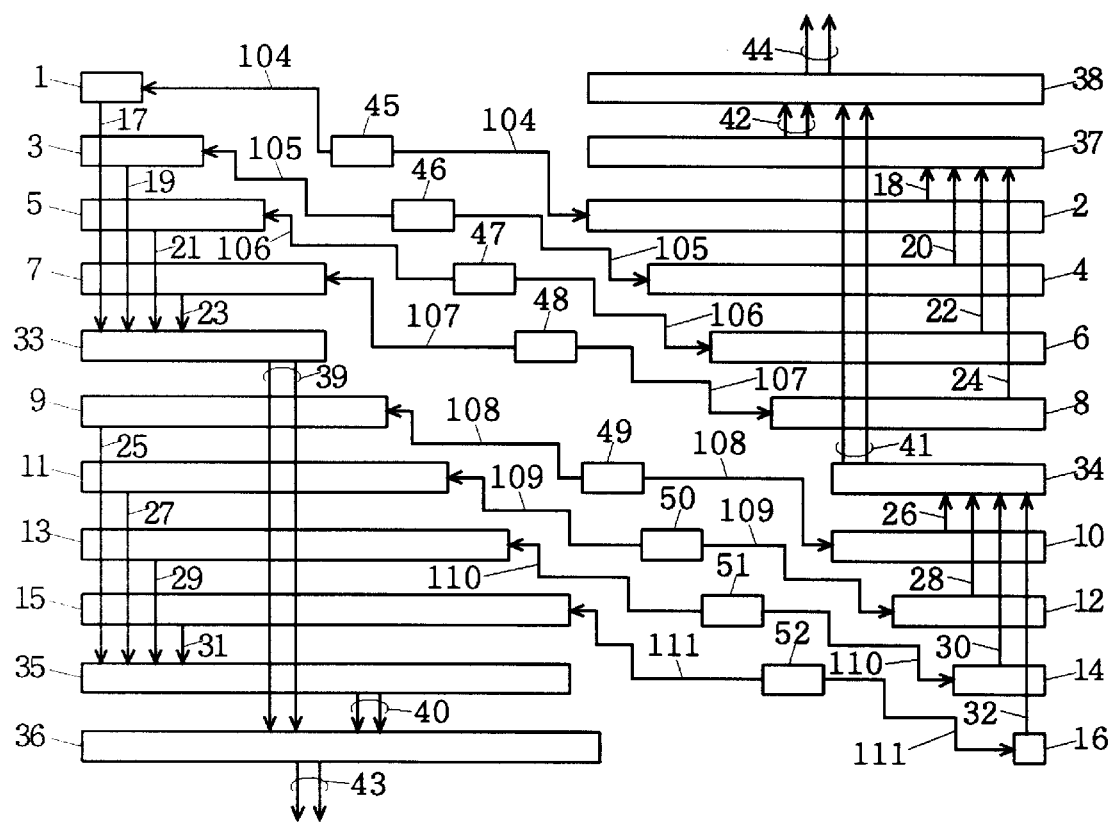
FIG. 11 is a block diagram showing a structure according to a seventh embodiment of the present invention.

FIG. 11 is a block diagram showing a structure according to a seventh embodiment of the present invention. For the array described in the second embodiment with reference to FIG. 6, the state in which Booth encode elements 45 to 52 are provided is shown in FIG. 11.

In the third and seventh embodiments, high and low order parts forming the same shifter/inverter are provided apart from each other by 2 rows. In the seventh embodiment, the corresponding Booth encode elements are provided in the rows between the rows where the high and low order parts forming the same shifter/inverters are provided.

More specifically, the Booth encode element 45 is provided between the high order part 3 of the shifter/inverter 114 and the low order adder 37 of the first adder 138 in a second row, the Booth encode element 46 is provided between the high order part 5 of the shifter/inverter 115 and the low order part 2 of the shifter/inverter 113 in a third row, the Booth encode element 47 is provided between the high order part 7 of the shifter/inverter 116 and the low order part 4 of the shifter/inverter 114 in a fourth row, the Booth encode element 48 is provided between the high order adder 33 of the first adder 138 and the low order part 6 of the shifter/inverter 115 in a fifth row, the Booth encode element 49 is provided between the high order part 11 of the shifter/inverter 118 and the low order adder 34 of the first adder 139 in a seventh row, the Booth encode element 50 is provided between the high order part 13 of the shifter/inverter 119 and the low order part 10 of the shifter/inverter 117 in an eighth row, the Booth encode element 51 is provided between the high order part 15 of the shifter/inverter 120 and the low order part 12 of the shifter/inverter 118 in a ninth row, and the Booth encode element 52 is provided between the high order adder 35 of the first adder 139 and the low order part 14 of the shifter/inverter 119 in a tenth row.

With such arrangement, it is possible to set, to almost equal values, the length of the wiring for transmitting the control signal 104 output from the left side of the Booth encode element 45 to the high order part 1 of the shifter/inverter 113 and the length of the wiring for transmitting the control signal 104 output from the right side of the Booth encode element 45 to the low order part 2 of the shifter/inverter 113. Accordingly, it is possible to suppress a skew in operating time of the same shifter/inverter.

As a matter of course, the effects obtained in the fourth and sixth embodiments in which the multiplier is given in parallel with the multiplicand can also be shown in the seventh embodiment.

C. Carry Processing

As mentioned a little in "(A) Basic Idea", the signal 61 is obtained from the carry terminal C of the adding element $P_{0207}$ corresponding to the most significant bit of the low order adder 34, the signal 62 is obtained from the carry-out terminal CO of the adding element $P_{0207}$, the signal 63 is obtained from the carry terminal C of the adding element $P_{0115}$ corresponding to the most significant bit of the low order adder 37, the signal 64 is obtained from the carry-out terminal CO of the adding element $P_{0115}$, the signal 65 is obtained from the carry terminal C of the adding element $P_{0315}$ corresponding to the most significant bit of the low order adder 38, and the signal 66 is obtained from the carry-out terminal CO of the adding element $P_{0315}$.

The signals 61 to 66 have values to be added on the 16th bit from the bottom of a multiplication result. In the following embodiments, variations in such processings will be described.

(C-1) Eighth Embodiment

Figure 12:
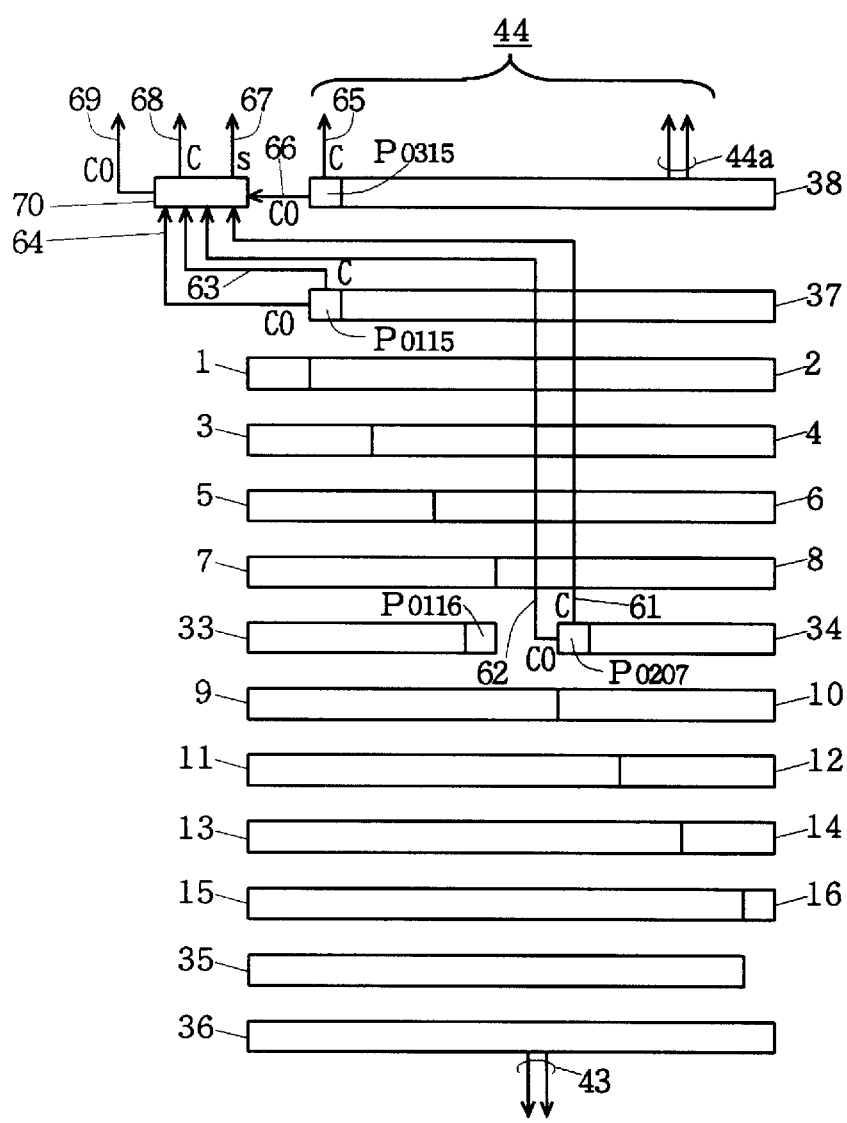
FIG. 12 is a block diagram showing a structure according to an eighth embodiment of the present invention.

FIG. 12 is a block diagram showing a structure according to an eighth embodiment of the present invention. In the array described in the first embodiment with reference to FIG. 2, a 4-input 2-output adding element 70 (for carry addition) for adding signals 61 to 64 and 66 is further provided. A low order partial product 44 comprises a signal 65 and a signal group 44a.

In FIG. 2, the signal 62 is not shown because it is sent to the carry-in terminal CI of the adding element $P_{0116}$. The signal 62 is sent to one of 4 inputs of the adding element 70 together with the signals 61, 63 and 64. The signal 66 is sent from a carry-out terminal CO of the adding element $P_{0315}$ to a carry-in terminal CI of the adding element 70.

As a result, signals 67 and 68 are obtained from a sum terminal S and a carry terminal C of the adding element 70 respectively, and a signal 69 is obtained from a carry-out terminal CO of the adding element 70. The signals 65 and 67 have values to be added on the 16th bit from the least significant bit of the multiplication result, and the signals 68 and 69 have values to be added on the 17th bit from the least significant bit of the multiplication result. In other words, it is necessary to add the signals 65 and 67 to two data on the least significant bit of the high order partial product 43 of the second partial product on the 16th bit from the least significant bit of the multiplication result, and it is necessary to add the signals 68 and 69 to two data on a higher order, by 1 bit, than the least significant bit of the high order partial product 43 of the second partial product on the 17th bit from the least significant bit of the multiplication result.

Figure 13:
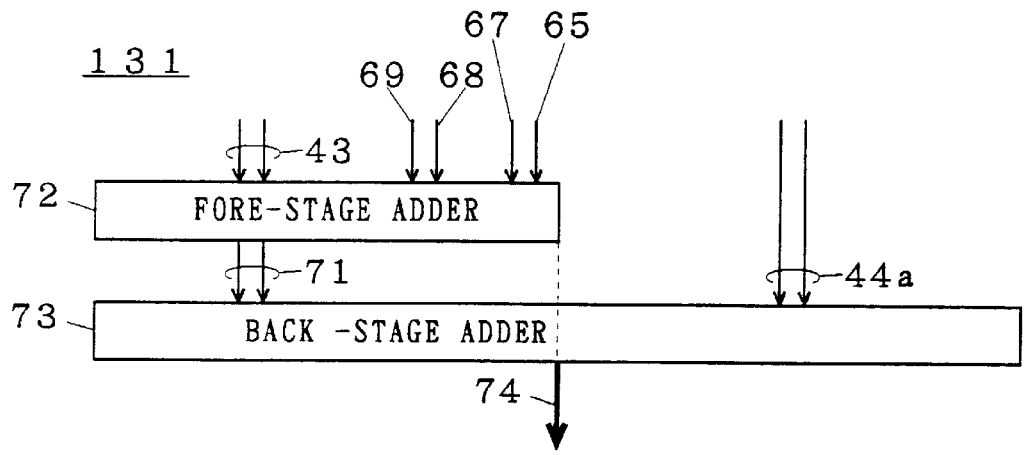
FIG. 13 is a block diagram showing the structure of a final adding portion 131.
Figure 21:
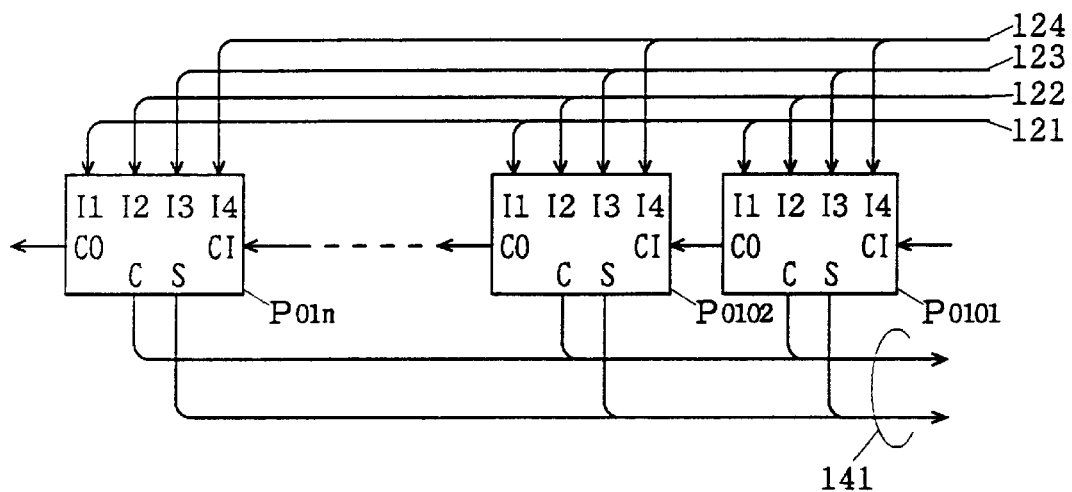
FIG. 21 and 22 are circuit diagrams showing the prior art.
Figure 22:
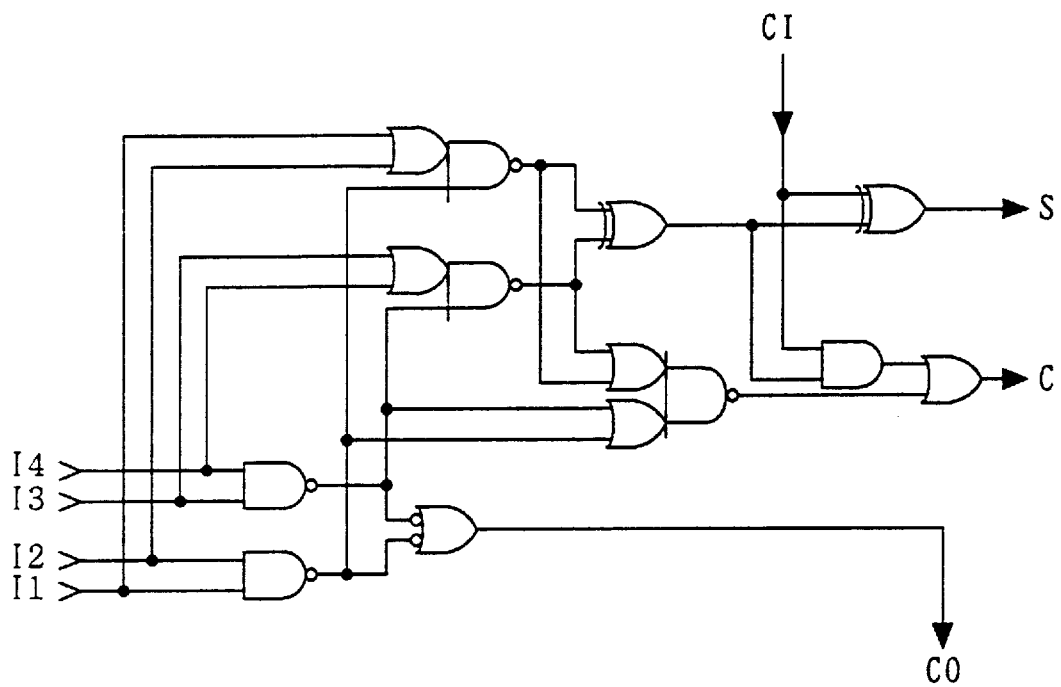
Figure 23:
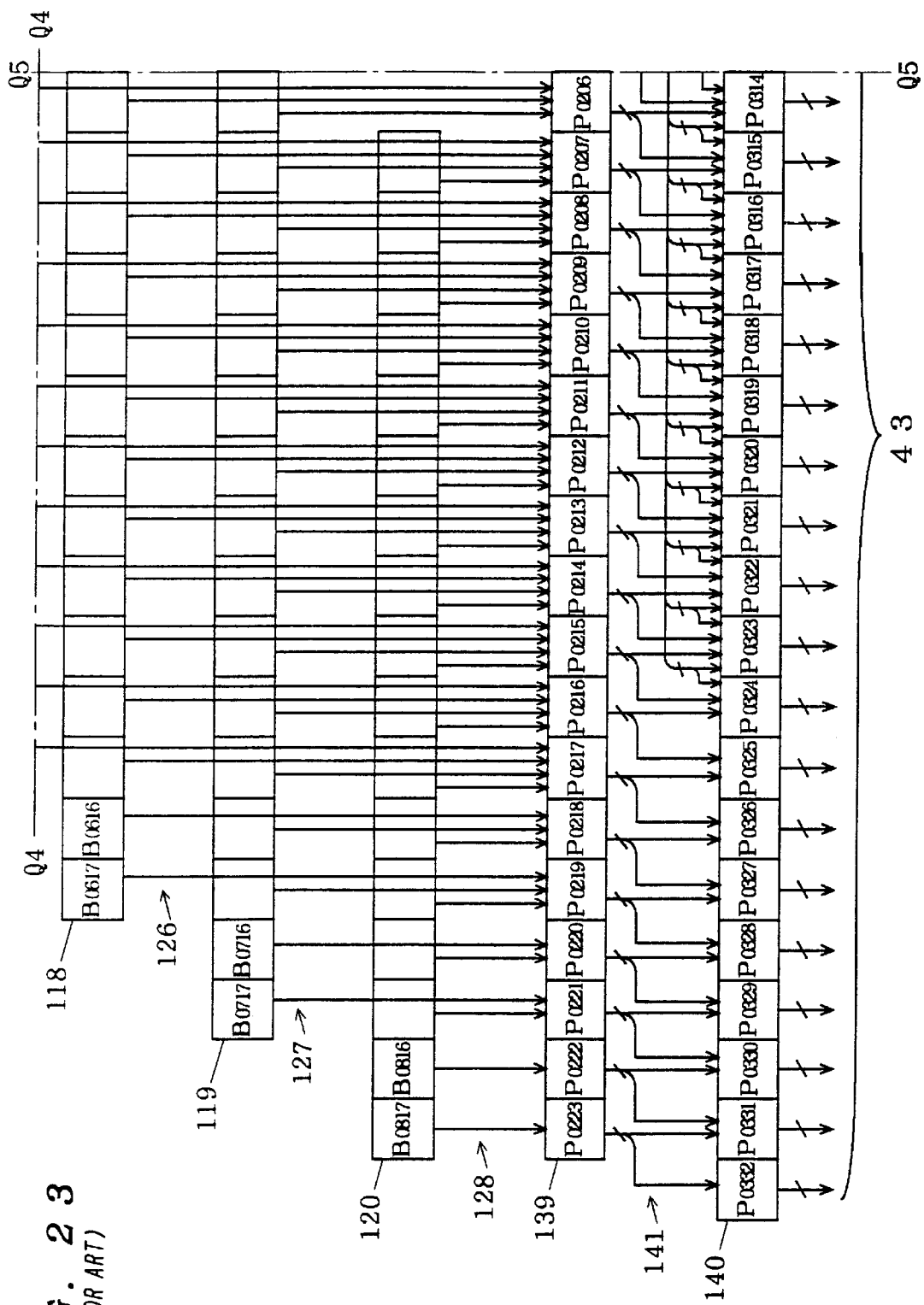
FIG. 23 is a block diagram showing the prior art together with FIGS. 24 to 26.
Figure 24:
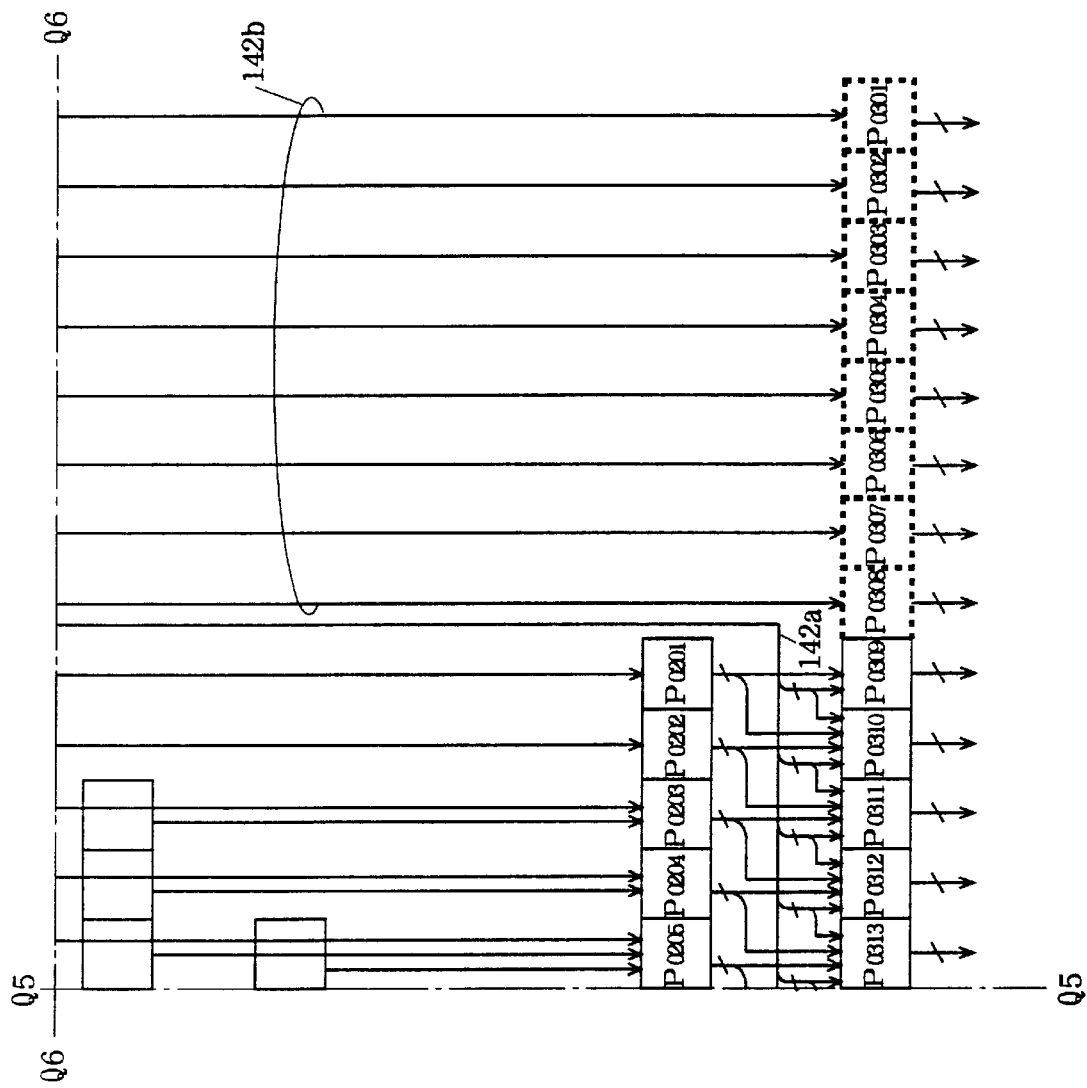
FIG. 24 is a block diagram showing the prior art together with FIGS. 23, 25 and 26.
Figure 25:
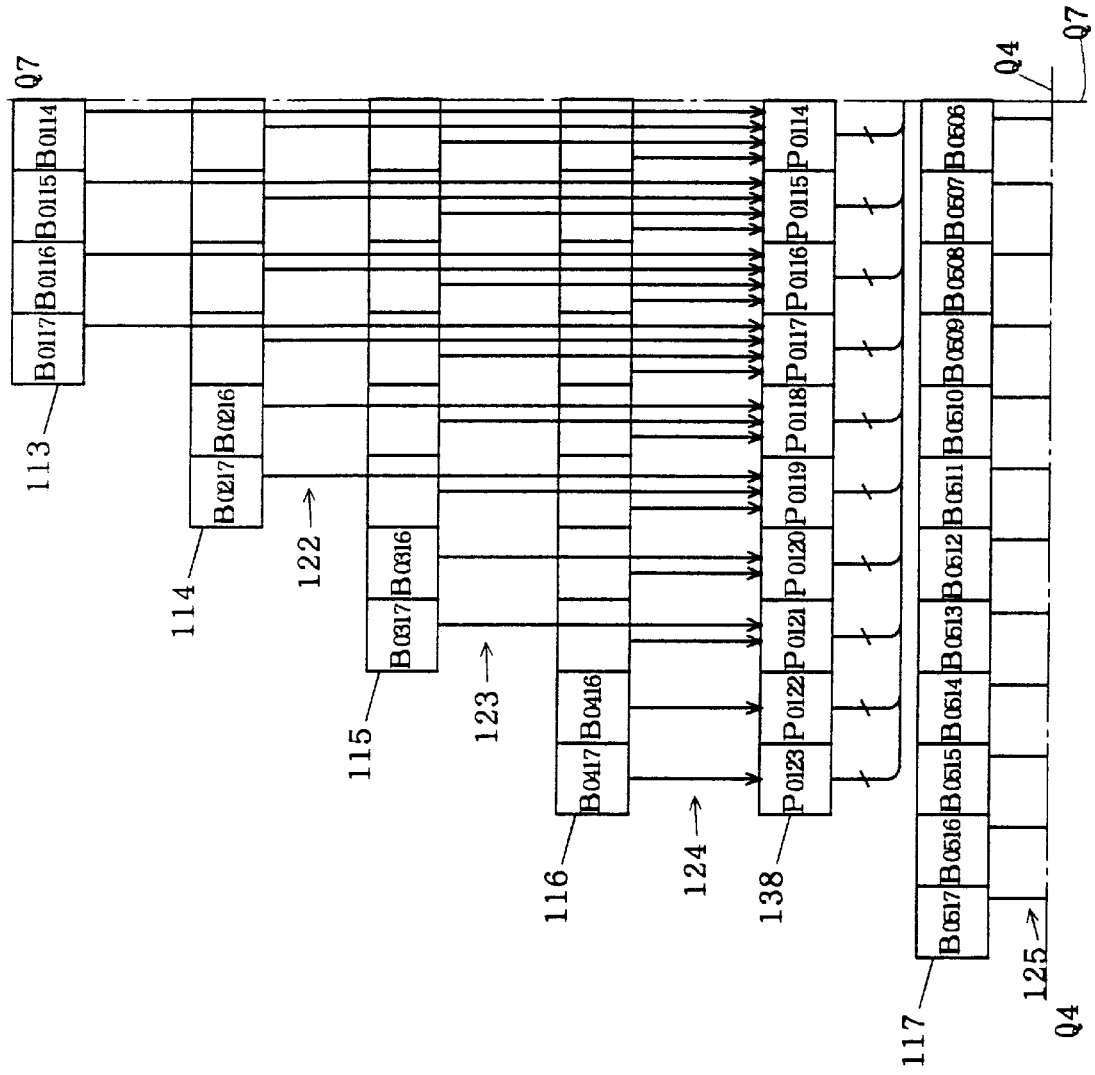
FIG. 25 is a block diagram showing the prior art together with FIGS. 23, 24 and 26.
Figure 26:
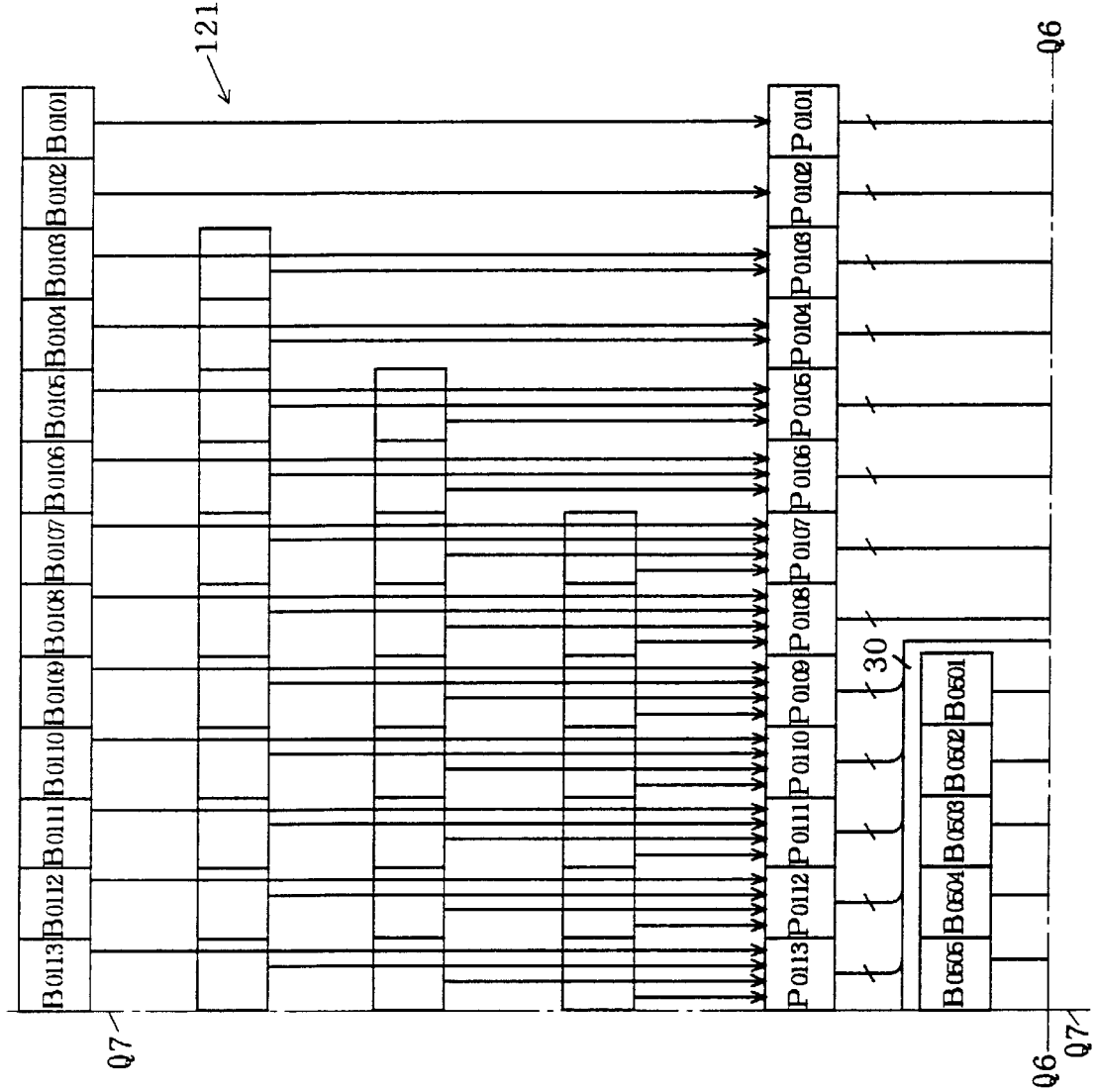
FIG. 26 is a block diagram showing the prior art together with FIGS. 23 to 25.

FIG. 13 is a block diagram showing the structure of a final adding portion 131. The final adding portion 131 comprises a fore-stage adder 72 and a back-stage adder 73. The fore-stage adder 72 is formed by 4-input 2-output adding elements for 17 bits which are connected as shown in FIG. 21 in the same manner as the high order adder 36. The back-stage adder 73 is formed by 2-input 1-output adding elements for 32 bits.

The fore-stage adder 72 inputs the high order partial product 43 of the second partial product and the signals 65 and 67 to 69, and outputs a signal group 71 which makes a pair for each bit. The back-stage adder 73 adds the signal group 44a on the low order side and the signal group 71 on the high order side respectively, and outputs a multiplication result 74.

With such a structure, only a pair of inputs are sent to the back-stage adder 73 for each bit. In other words, the signal groups 44a and 71 do not overlap each other on any bit. Consequently, the back-stage adder 73 can be implemented easily by the carry look ahead method or the like. In addition, the adding processing can be executed on the low order side of the back-stage adder 73 (bits to which the signal group 44a is input) at the same time during the execution of the adding processing on the fore-stage adder 72. Consequently, speed deterioration can be prevented from occurring due to the presence of the fore-stage adder 72. According to the present embodiment, thus, the carry processing can be performed without damaging the effects of the first embodiment and delaying a speed.

While the carry processing according to the first embodiment has been described in the present embodiment, it can also be applied to the second to seventh embodiments in the same manner.

(C-2) Ninth Embodiment

Figure 14:
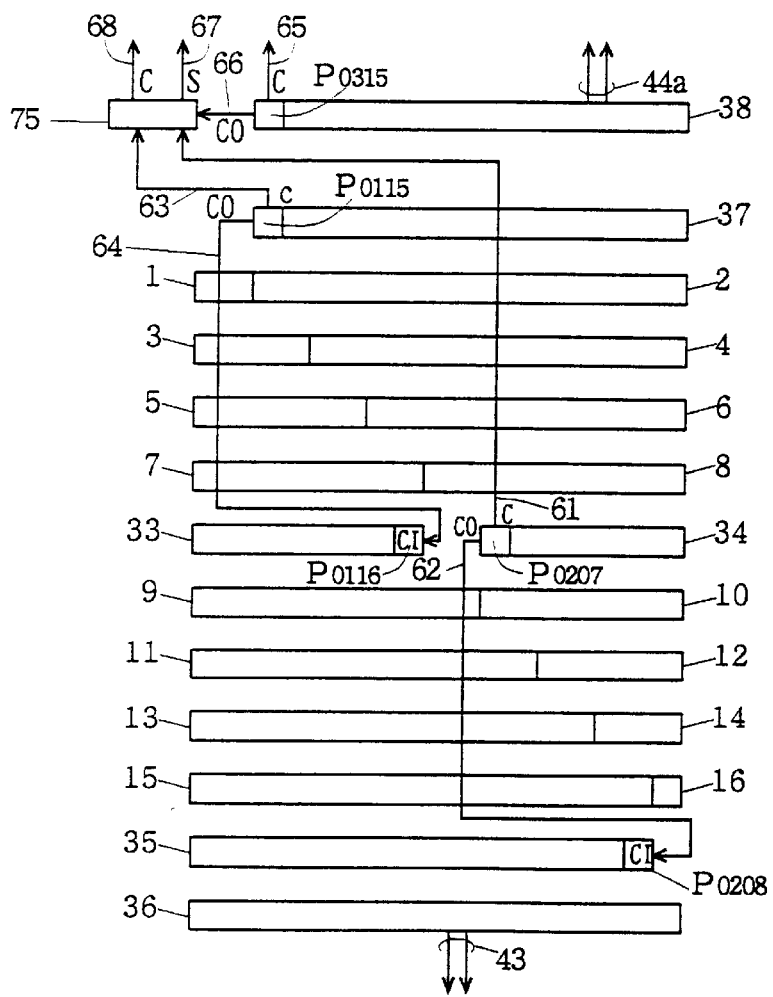
FIG. 14 is a block diagram showing a structure according to a ninth embodiment of the present invention.

FIG. 14 is a block diagram showing a structure according to a ninth embodiment of the present invention. In the array described in the first embodiment with reference to FIG. 5, a 2-input (with a carry-in terminal CI) 2-output adding element (for carry addition) 75 for adding signals 61 to 63 is further provided.

While the signal 62 is sent to the carry-in terminal CI of the adding element $P_{0116}$ in the "(A) Basic Idea", the signal 64 is sent thereto in the present embodiment. The reason is that the signal 64 is equivalent to the signal 62 in that it is a carry of a low order adder of a first adder.

The signal 62 is sent to the carry-in terminal CI of the adding element $P_{0208}$ Such ways of sending the signals 62 and 64 are common to the prior art shown in FIGS. 23 to 26.

The signals 61 and 63 are sent to two inputs of the adding element 75, and a signal 66 is sent to the carry-in terminal CI of the adding element 75. With the above structure, an addition result obtained by the adding element 75 is at most 1+1 +1=11. A 2-bit signal is enough to output the addition result. In other words, it is sufficient that the adding element 75 outputs only 1-bit signals 67 and 68. Consequently, a carry-out terminal CO is not necessary. Accordingly, the structure of the adding element 75 can be simplified more than that of the adding element 70. Furthermore, the wiring for transmitting a signal 69 is not necessary.

Figure 15:
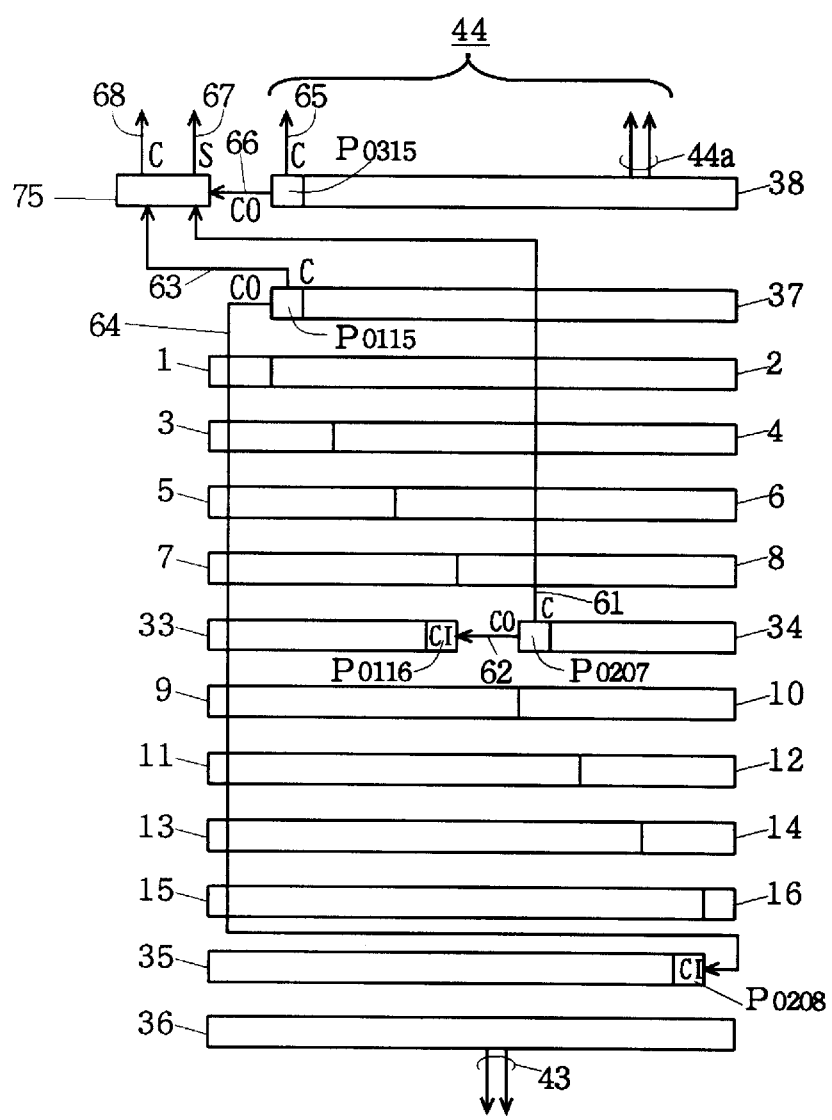
FIG. 15 is a block diagram showing another structure according to the ninth embodiment of the present invention.

As a matter of course, since the signals 62 and 64 are equivalent to each other, they can be replaced with each other. FIG. 15 shows a structure in which the signals 62 and 64 are replaced with each other for the structure shown in FIG. 14.

While the carry processing according to the first embodiment has been described in the present embodiment, it can also be applied to the second to seventh embodiments in the same manner.

The number of 0th partial products is 8 in the present embodiment. If the number of the 0th partial products is increased more so that the number of adding stages (order) of the Wallace tree is increased, the freedom of the combination of carry input and output can be enhanced. Thus, effects obtained by the idea of the present embodiment become more remarkable.

(C-3) Tenth Embodiment

Figure 16:
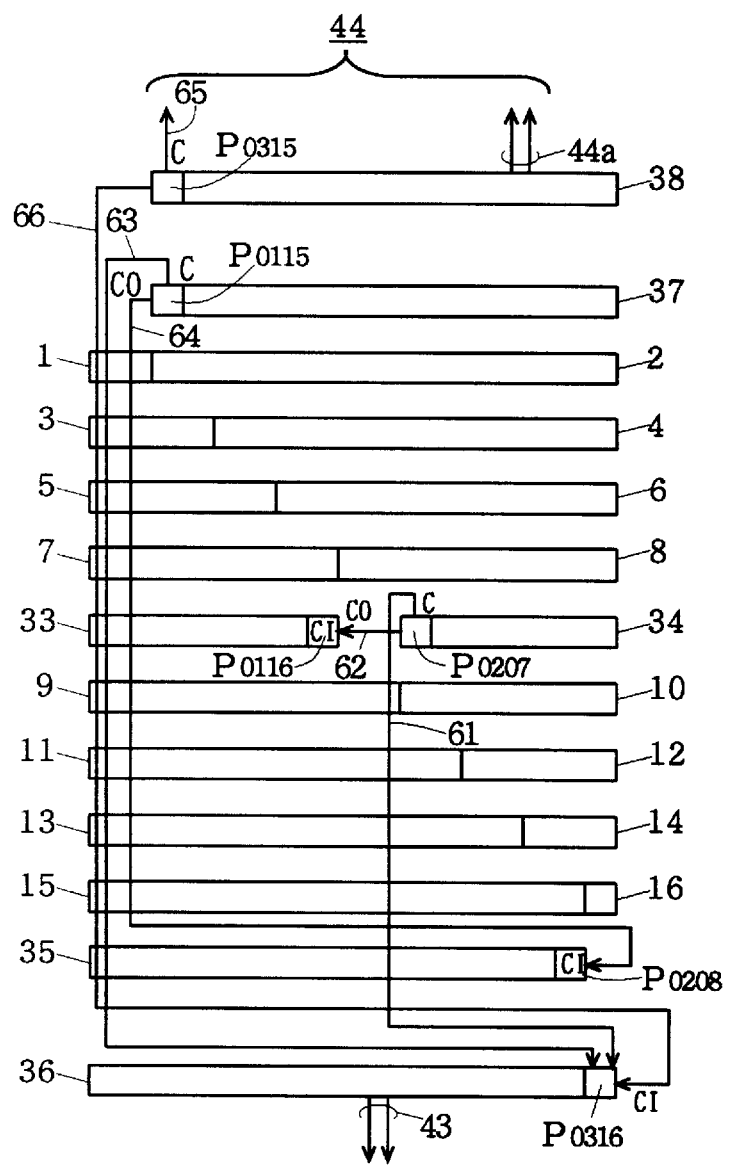
FIG. 16 is a block diagram showing a structure according to a tenth embodiment of the present invention.

FIG. 16 is a block diagram showing a structure according to a tenth embodiment of the present invention. For the array described in the first embodiment with reference to FIG. 5, the state in which signals 61 to 66 are transmitted is shown in FIG. 16.

The signals 62 and 64 which are ones of carry pairs obtained from low order adders of first adders are sent as carry-in to high order adders 33 and 35 of the first adders respectively (the signals 62 and 64 are sent to adding elements $P_{0116}$ and $P_{0208}$ respectively in FIG. 16, and they can be replaced with each other).

In FIG. 4, the adding element $P_{0316}$ of the high order adder 36 of the second adder 140 inputs only 2 bits, that is, 1 bit output from the high order adder 33 (more accurately, output from the sum terminal S of the adding element $P_{0116}$) and 1 bit output from the high order adder 35 (more accurately, output from the sum terminal S of the adding element $P_{0208}$).

The present embodiment describes the state in which the signal 66 that is one of a pair of carries obtained from an adding element $P_{0315}$ of a low order adder 38 of a second adder 140 and signals 63 and 61 that are the other carries obtained as pairs from adding elements $P_{0115}$ and $P_{0207}$ that belong to the first adders are sent to a carry-in terminal CI and two other input terminals of an adding element $P_{0316}$ that belongs to the second adder 140.

By transmitting the signals 61 to 64 and 66 as described above, it is not necessary to provide adding elements for carry addition separately. Consequently, it is possible to reduce the amount of hardware.

In this case, the signal 65 which is the other carry obtained as a pair from the adding element $P_{0315}$ of the low order adder 38 of the second adder 140 corresponds to the most significant bit of the low order partial product 44 of the second partial product. Consequently, the signal 65 can be sent, to a back-stage adder 73, as carry-in on a bit corresponding to the signal 65 of the back-stage adder 73 (that is, the least significant bit of a low order partial product 43 of the second partial product). Accordingly, a fore-stage adder 72 can also be omitted in a final adding portion 131. Thus, the amount of hardware can be reduced still more.

While the carry processing according to the first embodiment has been described in the present embodiment, it can also be applied to the second to seventh embodiments in the same manner.

(C-4) Eleventh Embodiment

While the case where the first and second adders of the Wallace tree are formed by 4-input 2-output adding elements has been described in the above embodiments, they can be formed by 3-input 2-output adding elements.

Figure 17:
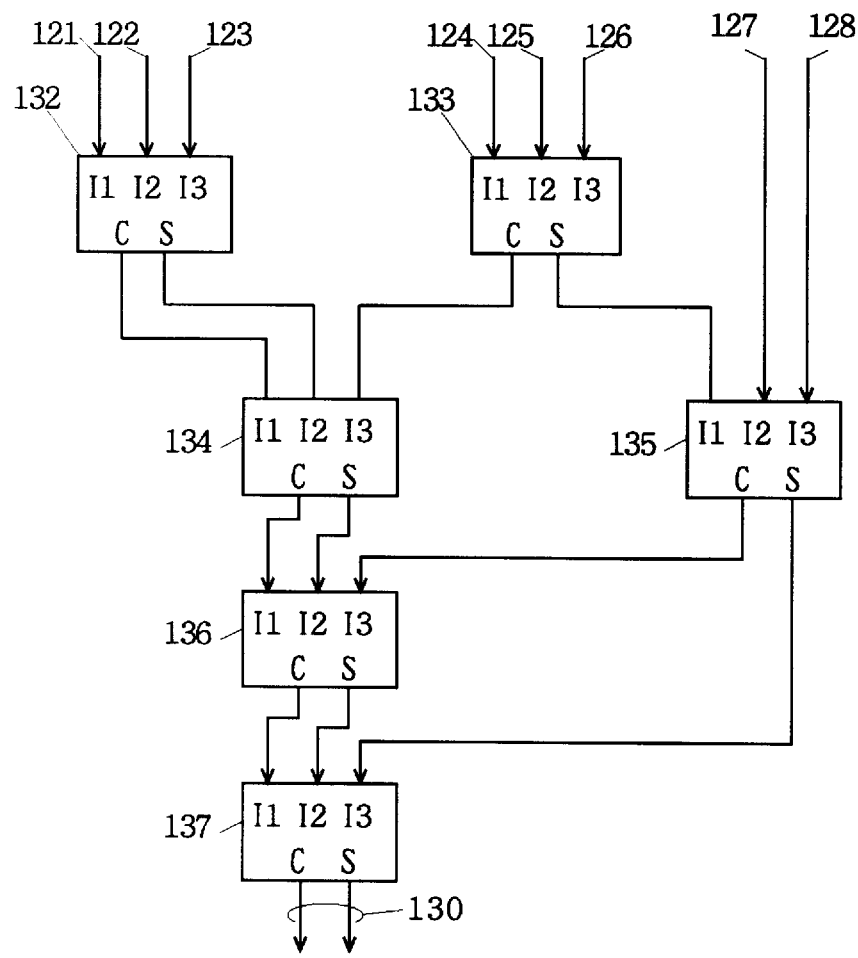
FIGS. 17 and 18 are block diagrams showing a structure according to an eleventh embodiment of the present invention.

FIG. 17 is a block diagram showing the case where a Wallace tree circuit 129 is formed by first adders 132 and 133, second adders 134 and 135, a third adder 136, and a fourth adder 137.

0th partial products 121 to 123 are sent to the first adder 132. 0th partial products 124 to 126 are sent to the first adder 133. The output of the first adder 132 and the high order side of the output of the first adder 133 (which are first partial products) are sent to the second adder 134. The low order side of the output of the first adder 133 (which is the first partial product) and 0th partial products 127 and 128 are sent to the second adder 135. The output of the second adder 134 and the high order side of the output of the second adder 135 (which are second partial products) are sent to the third adder 136. The output of the third adder 136 (which is a third partial product) and the low order side of the output of the second adder 135 (which is the second partial product) are sent to the fourth adder 137. The fourth adder 137 outputs final partial products 130.

Figure 18:
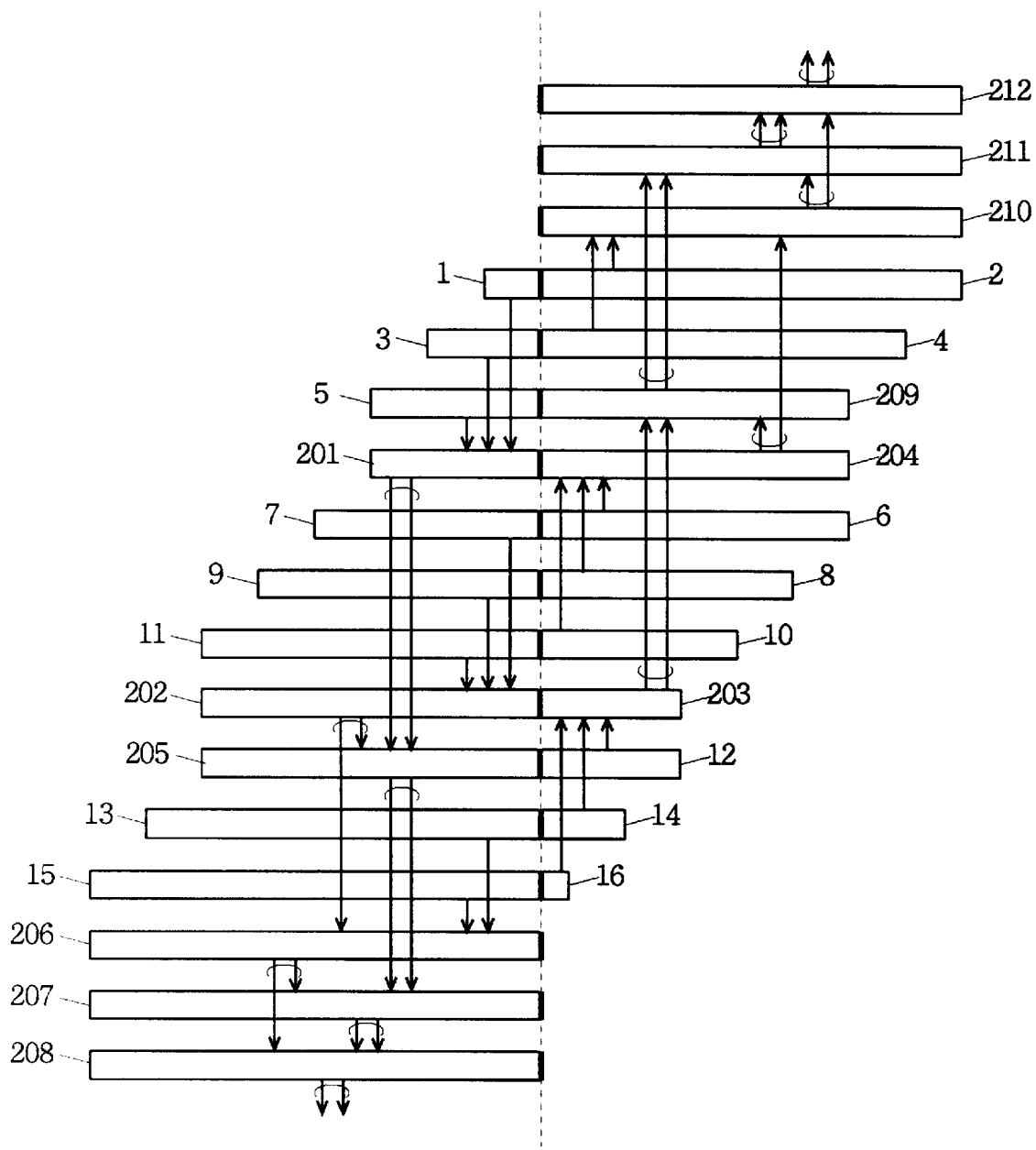

Thus, even if the number of adding stages (order) of the Wallace tree circuit 129 is increased, the present invention can be applied. FIG. 18 is a block diagram showing the transmission of partial products in the Wallace tree that is formed by 3-input 2-output adding elements. A high order adder 201 which is a part of the first adder adds signals output as the 0th partial products from high order parts 1, 3 and 5, and sends two outputs as the first partial products to a high order adder 205 which is a part of the second adder. A high order adder 202 which is a part of the first adder adds signals output as the 0th partial products from high order parts 7, 9 and 11, and sends one of two outputs as the first partial products to the high order adder 205.

The other output of the high order adder 202 is sent to a high order adder 206 which is a part of the second adder together with signals output as the 0th partial products from high order parts 13 and 15. One of the two outputs as the second partial products of the high order adder 206 is sent to a high order adder 207 which is a part of the third adder together with signals output as the second partial products from the high order adder 205. The high order adder 207 sends two outputs as the third partial products to a high order adder 208 which is a part of the fourth adder. The other output as the second partial product of the high order adder 206 is also sent to the high order adder 208. The high order adder 208 outputs signals which function as fourth partial products.

A low order adder 203 which is a part of the first adder adds signals output as the 0th partial products from low order parts 12, 14 and 16, and sends two outputs as the first partial products to a low order adder 209 which is a part of the second adder. A low order adder 204 which is a part of the first adder adds signals output as the 0th partial products from low order parts 6, 8 and 10, and sends one of the two outputs as the first partial products to the low order adder 209.

The other output of the low order adder 204 is sent to a low order adder 210 which is a part of the second adder together with signals output as the 0th partial products from low order parts 2 and 4. One of two outputs as the second partial products of the low order adder 210 is sent to a low order adder 211 which is a part of the third adder together with signals output as the second partial products from the low order adder 209. The low order adder 211 sends two outputs as the third partial products to a low order adder 212 which is a part of the fourth adder. The other output as the second partial product of the low order adder 210 is also sent to the low order adder 212. The low order adder 212 outputs signals which function as fourth partial products.

The structure of FIG. 18 corresponds to those of FIGS. 1 to 4. In the same manner as Embodiments shown in FIGS. 5 to 16, thus, the shifter/inverters and adders are arranged so that the area can be used effectively.

While the Booth algorithm has been used in the above embodiments, it is needless to say that the present invention can also be applied to the case where the Booth algorithm is not used.

While the invention has been described in detail, the foregoing description is in all aspects illustrative and not restrictive. It is understood that numerous other modifications and variations can be devised without departing from the scope of the invention.

I claim:

1. A multiplication element comprising:

a plurality of partial product generating circuits for inputting a multiplicand and a plurality of modified multipliers obtained based on a multiplier, and for generating $0^{th}$ partial products corresponding to said modified multipliers;

a Wallace tree circuit formed by an array of rows comprising at least one i-th ($1 \leq i$) adder each of said at least one i-th adder comprising a plurality of bits arranged in columns said Wallace tree circuit being adapted to add a predetermined number of j-th ($0 \leq j \leq i-1$) partial products so as to generate i-th partial products, add partial products like a tree while sequentially decreasing the number of said partial products and output a pair of final partial products; and a final adder for adding said pair of final partial products so as to obtain a result of the multiplication of said multiplicand by said multiplier, wherein said at least one i-th adder of said Wallace tree circuit is separated on a particular bit of said multiplication result as a boundary into high and low order adders and said high and low order adders are provided in rows which are different from each other.

2. The multiplication clement according to claim 1, wherein a pair of first adders of said at least one i-th adder are provided;

said high order adder of one of said first adders is transversely shorter than said high order adder of another of said first adders, said low order adder of said another of said first adders is transversely shorter than said one of said first adders; and said high order adder of said one of said first adders and said low order adder of said another of said first adders are provided in the same row.

3. The multiplication element according to claim 2, wherein first ends of said partial product generating circuits are arranged on a first end of said i-th adder in the same column.

4. The multiplication element according to claim 1, wherein said partial product generating circuits are divided into high order parts corresponding to said high order adders of said first adders and low order parts corresponding to said low order adders of said first adders respectively;

said high order adders of said first adders are provided in the same rows as one of said low order parts of said partial product generating circuits; and said low order adders of said first adders are provided in the same rows as one of said high order parts of said partial product generating circuits.

5. The multiplication element according to claim 1, further comprising a plurality of Booth encoders for generating said modified multipliers according to a Booth algorithm based on said multiplier respectively.

6. The multiplication element according to claim 5, wherein said partial product generating circuits are divided into high order parts corresponding to said high order adders of said first adders and low order parts corresponding to said low order adders of said first adders respectively; and each of said Booth encoders is provided in the same row as said high order part of said partial product generating circuit corresponding thereto.

7. The multiplication element according to claim 6, wherein said Booth encoders are provided in the same rows as said low order parts of said partial product generating circuits corresponding thereto.

8. The multiplication element according to claim 7, wherein a pair of said first adders are provided;

said high order adder of one of said first adders is transversely shorter than said high order adder of another of said first adders;

said low order adder of said another of said first adders is transversely shorter than said one of said first adders; and said high order adder of said one of said first adders and said low order adder of said another of said first adders are provided in the same row.

9. The multiplication element according to claim 7, wherein each of said Booth encoders is provided between said high and low order parts of said partial product generating circuit corresponding to said each of said Booth encoders.

10. The multiplication element according to claim 6, wherein said high order adders of said first adders are provided in the same rows as one of said low order parts of said partial product generating circuits; and said low order adders of said first adders are provided in the same rows as one of said high order parts of said partial product generating portions.

11. The multiplication element according to claim 10, wherein each of said Booth encoders is provided between said low order part of said partial product generating circuit which is different from said corresponding partial product generating circuit or said low order adder of said i-th adder, and said high order part of said corresponding partial product generating circuit.

12. The multiplication element according to claim 5, wherein said partial product generating circuits are divided into high order parts corresponding to said high order adders of said first adders and low order parts corresponding to said low order adders of said first adders respectively;

said high and low order parts of said partial product generating circuits are provided in different rows respectively; and each of said Booth encoders is provided in a row between a row where said high order part of said partial product generating circuit corresponding to said each of said Booth encoders is provided and a row where said low order part of said partial product generating circuit corresponding to said each of said Booth encoders is provided.

13. The multiplication element according to claim 12, wherein said high and low order parts forming one of said partial product generating circuits are respectively provided in a pair of rows with a middle row therebetween, and one of said Booth encoders corresponding to said partial product generating circuit is provided in said middle row.

14. The multiplication element according to claim 1, wherein a pair of first adders of said at least one i-th adder are provided; and said low order adder of one of said first adders is provided on an opposite side with respect to said low order adder of said another of said first adders of said high order adder of another of said first adders.

15. The multiplication element according to claim 1, wherein $i \leq N, N \geq 2$, said N-th adder outputs said pair of final partial products, wherein said Wallace tree circuit further comprises a carry adder for adding low order carries which are carries obtained from the most significant bits of said low order adders of said (N−1)-th adder respectively to a first carry of a pair of carries obtained from the most significant bit of said low order adder of said N-th adder;

said final adder comprising:

fore-stage adder for adding the high order side of said pair of said final partial products to the output of said carry adder and a second carry of a pair of carries obtained from the most significant bit of said low order adder of said N-th adder, and a back-stage adder for inputting the output of said fore-stage adder, and the low order side of said pair of said final partial products except for said second carry so as to obtain said multiplication result.

16. The multiplication element according to claim 1, wherein $i \leq N, N \geq 2$, said N-th adder outputs said pair of final partial products, wherein said Wallace tree circuit further comprises a carry adder for adding a first one of each of the low order carry pairs which are obtained from the most significant bits of said low order adders of said (N−1)-th adder respectively to a first carry of a pair of carries obtained from the most significant bit of said low order adder of said N-th adder;

wherein a second one of each of said low order carry pairs of said low order adders of said (N−1)-th adder functions as carry-in on the least significant bit of said high order adder of said (N−1)-th adder;

said final carry adder comprising:

a fore-stage adder for adding a high order side of said pair of said final partial products to the output of said carry adder and a second carry of a pair of carries obtained from the most significant bit of said low order adder of said N-th adder, and a back-stage adder for inputting the output of said fore-stage adder, and the low order side of said pair of said final partial products except for said second carry so as to obtain said multiplication result.

17. The multiplication element according to claim 1, wherein a first one of each of said low order carry pairs of said low order adders of said i-th adder functions as carry-in on the least significant bit of said high order adder of said i-th adder; and a second one of each of said low order carry pairs of said low order adders of said i-th adder functions as an input on the least significant bit of said high order adder of an (i+1)th adder.

* * * * *